(12) United States Patent
Fujii et al.

(10) Patent No.: US 7,616,263 B2
(45) Date of Patent: Nov. 10, 2009

(54) INFORMATION-PROCESSING APPARATUS AND REMOVABLE SUBSTRATE USED THEREIN

(75) Inventors: Takeyuki Fujii, Tokyo (JP); Tetsujiro Kondo, Tokyo (JP); Kazutaka Ando, Kanagawa (JP); Naoki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 11/339,041

(22) Filed: Jan. 25, 2006

(65) Prior Publication Data
US 2006/0187353 A1 Aug. 24, 2006

(30) Foreign Application Priority Data
Jan. 27, 2005 (JP) .............................. P2005-020053

(51) Int. Cl.
H04N 5/44 (2006.01)
H04N 5/14 (2006.01)
H04N 9/74 (2006.01)

(52) U.S. Cl. ..................... 348/561; 348/581; 348/673

(58) Field of Classification Search .............. 348/561, 348/581, 562, 582, 725, 553, 728, 673, 687, 348/649; 382/274, 275, 254, 298, 300; H04N 5/44, H04N 9/74, 5/14, 9/64, 5/57
See application file for complete search history.

(56) References Cited

U.S. PATENT DOCUMENTS

| 4,827,433 | A | 5/1989 | Kamon |
| 7,424,171 | B2 * | 9/2008 | Matsuzaka ................. 382/275 |
| 2006/0197874 | A1 * | 9/2006 | Matsuda et al. ............. 348/581 |
| 2006/0225122 | A1 * | 10/2006 | Aratani et al. .............. 348/725 |

FOREIGN PATENT DOCUMENTS

JP 2789560 6/1998

* cited by examiner

*Primary Examiner*—Sherrie Hsia
(74) *Attorney, Agent, or Firm*—K&L Gates LLP

(57) ABSTRACT

An information-processing apparatus is provided. For example, the information-processing apparatus has an information-processing device that processes information and a removable substrate that is detachably connected to the information-processing device. The information-processing device has a signal-processing unit that processes a received informational signal to set quality of output by the informational signal to prescribed quality, an adjusting unit that allows a user to adjust the prescribed quality in the signal-processing unit, and a setting unit that allows the user to set at least any one of a state of the received informational signal and a state of the output by the informational signal. The removable substrate has a storage unit that stores a set history of the setting unit and an adjustment history of the adjusting unit.

12 Claims, 18 Drawing Sheets

(PREDICTION TAP)

(CLASS TAP)

FIG. 12A

```
2003/11/07 12:12:59  POWER ON
2003/11/07 12:13:00  CHANNEL 8
2003/11/07 12:23:02  CHANNEL 1
2003/11/07 12:33:04  ZOOM RATIO 1.5:1
2003/11/07 13:23:23  NOISE REDUCTION VALUE 15 RESOLUTION VALUE 10
2003/11/07 14:23:55  CHANNEL 8
2003/11/07 14:52:59  CHANNEL 1
2003/11/07 15:10:00  POWER OFF
2003/11/07 20:20:02  POWER ON
2003/11/07 20:25:04  CHANNEL 8
2003/11/07 20:45:23  ZOOM RATIO 3.0:1
2003/11/07 22:23:55  NOISE REDUCTION VALUE 80 RESOLUTION VALUE 50
2003/11/07 23:23:55  POWER OFF
2003/11/08 12:12:59  POWER ON
2003/11/08 12:13:00  CHANNEL 8
2003/11/08 12:23:02  CHANNEL 1
2003/11/08 12:33:04  ZOOM RATIO 1.5:1
2003/11/08 13:23:23  NOISE REDUCTION VALUE 43 RESOLUTION VALUE 100
2003/11/08 14:23:55  CHANNEL 8
2003/11/08 14:52:59  CHANNEL 1
2003/11/08 15:10:00  POWER OFF
2003/11/08 20:20:02  POWER ON
2003/11/08 20:25:04  CHANNEL 8
2003/11/08 20:45:23  ZOOM RATIO 2.0:1
2003/11/08 22:23:55  NOISE REDUCTION VALUE 53 RESOLUTION VALUE 150
2003/11/08 23:23:55  POWER OFF
2003/11/09 12:12:59  POWER ON
2003/11/09 12:13:00  CHANNEL 8
2003/11/09 12:23:02  CHANNEL 1
2003/11/09 12:33:04  ZOOM RATIO 1.5:1
2003/11/09 13:23:23  NOISE REDUCTION VALUE 53 RESOLUTION VALUE 10
2003/11/09 14:23:55  CHANNEL 8
2003/11/09 14:52:59  CHANNEL 1
2003/11/09 15:10:00  POWER OFF
2003/11/09 20:20:02  POWER ON
2003/11/09 20:25:04  CHANNEL 8
2003/11/09 20:45:23  ZOOM RATIO 1.0:1
2003/11/09 22:23:55  NOISE REDUCTION VALUE 53 RESOLUTION VALUE 50
2003/11/09 23:23:55  POWER OFF
2003/11/10 12:12:59  POWER ON
2003/11/10 12:13:00  CHANNEL 8
2003/11/10 12:23:02  CHANNEL 1
2003/11/10 12:33:04  ZOOM RATIO 1.5:1
2003/11/10 13:23:23  NOISE REDUCTION VALUE 43 RESOLUTION VALUE 100
2003/11/10 14:23:55  CHANNEL 8
2003/11/10 14:52:59  CHANNEL 1
2003/11/10 15:10:00  POWER OFF
2003/11/10 20:20:02  POWER ON
2003/11/10 20:25:04  CHANNEL 8
2003/11/10 20:45:23  ZOOM RATIO 3.0:1
```

FIG. 12B

```
2003/11/07 12:12:59  POWER ON
2003/11/07 12:13:00  CHANNEL 8
2003/11/07 12:23:02  CHANNEL 1
2003/11/07 12:33:04  ZOOM RATIO 1.5:1
2003/11/07 13:23:23  NOISE REDUCTION VALUE 15 RESOLUTION VALUE 10
2003/11/07 14:23:55  CHANNEL 8
2003/11/07 14:52:59  CHANNEL 1
2003/11/07 15:10:00  POWER OFF
2003/11/07 20:20:02  POWER ON
2003/11/07 20:25:04  CHANNEL 8
2003/11/07 20:45:23  ZOOM RATIO 3.0:1
2003/11/07 22:23:55  NOISE REDUCTION VALUE 80 RESOLUTION VALUE 50
2003/11/07 23:23:55  POWER OFF
2003/11/08 12:12:59  POWER ON
2003/11/08 12:13:00  CHANNEL 8
2003/11/08 12:23:02  CHANNEL 1
2003/11/08 12:33:04  ZOOM RATIO 1.5:1
2003/11/08 13:23:23  NOISE REDUCTION VALUE 43 RESOLUTION VALUE 100
2003/11/08 14:23:55  CHANNEL 8
2003/11/08 14:52:59  CHANNEL 1
2003/11/08 15:10:00  POWER OFF
2003/11/08 20:20:02  POWER ON
2003/11/08 20:25:04  CHANNEL 8
2003/11/08 20:45:23  ZOOM RATIO 2.0:1
2003/11/08 22:23:55  NOISE REDUCTION VALUE 53 RESOLUTION VALUE 150
2003/11/08 23:23:55  POWER OFF
2003/11/09 12:12:59  POWER ON
2003/11/09 12:13:00  CHANNEL 8
2003/11/09 12:23:02  CHANNEL 1
2003/11/09 12:33:04  ZOOM RATIO 1.5:1
2003/11/09 13:23:23  NOISE REDUCTION VALUE 30 RESOLUTION VALUE 10
2003/11/09 14:23:55  CHANNEL 8
2003/11/09 14:52:59  CHANNEL 1
2003/11/09 15:10:00  POWER OFF
2003/11/09 20:20:02  POWER ON
2003/11/09 20:25:04  CHANNEL 8
2003/11/09 20:45:23  ZOOM RATIO 1.0:1
2003/11/09 22:23:55  NOISE REDUCTION VALUE 53 RESOLUTION VALUE 50
2003/11/09 23:23:55  POWER OFF
2003/11/10 12:12:59  POWER ON
2003/11/10 12:13:00  CHANNEL 8
2003/11/10 12:23:02  CHANNEL 1
2003/11/10 12:33:04  ZOOM RATIO 1.5:1
2003/11/10 13:23:23  NOISE REDUCTION VALUE 43 RESOLUTION VALUE 100
2003/11/10 14:23:55  CHANNEL 8
2003/11/10 14:52:59  CHANNEL 1
2003/11/10 15:10:00  POWER OFF
2003/11/10 20:20:02  POWER ON
2003/11/10 20:25:04  CHANNEL 8
2003/11/10 20:45:23  ZOOM RATIO 3.0:1
```

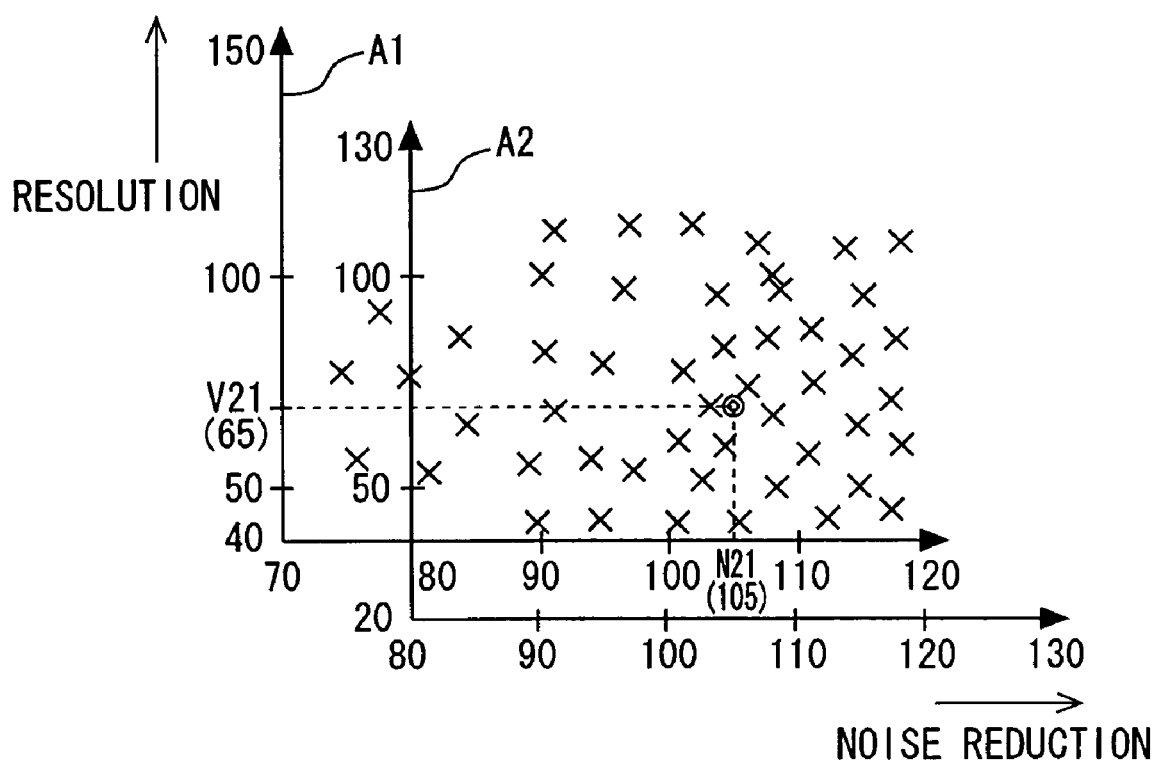
F I G. 1 4

INFORMATION-PROCESSING APPARATUS AND REMOVABLE SUBSTRATE USED THEREIN

CROSS REFERENCE TO RELATED APPLICATIONS

The present application claims priority to Japanese Patent Application JP 2005-20053 filed in the Japanese Patent Office on Jan. 27, 2005, the entire contents of which being incorporated herein by reference.

BACKGROUND

The present application relates to an information-processing apparatus and a removable substrate used therein. More particularly, it relates to an information-processing apparatus and the like that are well applicable to a television receiver or the like.

A television receiver having a zoom function has recently proposed. On this television receiver, a user can control the receiver to zoom in or out so that an image can be displayed as to be enlarged or reduced by a zooming ratio that he or she desires.

If the image is displayed as to be enlarged or reduced, its modulation transfer function (MTF) also varies. For example, Japanese Patent No. 2789560 discloses that a compensation factor corresponding to the zoom ratio is provided and the MTF can be adjusted based on the compensation factor.

SUMMARY

However, such a technology disclosed in the Japanese Patent No. 2789560 adjusts image quality based on the compensation factor, which is uniquely set according to the zoom ratio. It thus has been difficult to provide image quality that is suited to each individual user's preference.

It is desirable to provide an information-processing apparatus and the like that have less complex configuration and can easily adjust a quality of output that is suited to each individual user's preference.

According to an embodiment, there is provided an information-processing apparatus having an information-processing device that processes information and a removable substrate that is detachably connected to the information-processing device. The information-processing device includes signal-processing means for processing a received informational signal to set a quality of output by the received informational signal to a prescribed quality. The information-processing device also includes adjusting means for allowing a user to adjust the prescribed quality in the signal-processing means and setting means for allowing the user to set at least any one of a state of the received informational signal and a state of output by the received informational signal. The removable substrate includes storage means for storing a set history of the setting means and an adjustment history of the adjusting means.

According to another embodiment, there is provided an information-processing apparatus having an information-processing device that processes information and a removable substrate that is detachably connected to the information-processing device. The information-processing device includes a signal-processing unit configured to process a received informational signal to set a quality of output by the received informational signal to a prescribed quality. The information-processing device also includes an adjusting unit configured to allow a user to adjust the prescribed quality in the signal-processing unit and a setting unit configured to allow the user to set at least any one of a state of the received informational signal and a state of output by the received informational signal. The removable substrate includes a storage unit configured to store a set history of the setting unit and an adjustment history of the adjusting unit.

According to a further embodiment there is provided a removable substrate that is detachably connected to an information-processing apparatus. The information-processing apparatus has signal-processing means for processing a received informational signal to set a quality of output by the received informational signal to a prescribed quality, adjusting means for allowing a user to adjust the prescribed quality in the signal-processing means, and setting means for allowing the user to set at least any one of a state of the received informational signal and a state of output by the received informational signal. The removable substrate includes storage means for storing a set history of the setting means and an adjustment history of the adjusting means.

According to another embodiment, there is provided a removable substrate that is detachably connected to an information-processing apparatus. The information-processing apparatus has a signal-processing unit configured to process a received informational signal to set a quality of output by the received informational signal to a prescribed quality, an adjusting unit configured to allow a user to adjust the prescribed quality in the signal-processing unit and a setting unit configured to allow the user to set at least any one of a state of the received informational signal and a state of output by the received informational signal. The removable substrate includes a storage unit configured to store a set history of the setting unit and an adjustment history of the adjusting unit.

In the embodiments of the invention, the removable substrate is detachably connected to the information-processing device (the information-processing apparatus). In the information-processing device, the signal-processing means processes the informational signal that the information-processing apparatus receives to set a quality of output by the received informational signal to a prescribed quality.

The informational signal includes an image signal, an audio signal and the like. When the informational signal is an image signal, the quality of output by the informational signal relates to resolution of the image by the image signal, a noise reduction therein or the like. When the informational signal is an audio signal, the quality of output by the informational signal relates to noise reduction of audio in the audio signal or the like.

In the information-processing device, a user can use the adjusting means to adjust the prescribed quality in the signal-processing means. Similarly, in the information-processing device, the user can use the setting means to set at least any one of a state of the received informational signal and a state of the output by the informational signal.

For example, the state of the received informational signal includes any one of a switched state of broadcast channel from which the informational signal is obtained and a switched state of informational signal source from which the informational signal is obtained.

Further, the state of output by the informational signal is illustratively a zoom state of image by the image signal when the informational signal is an image signal.

The removable substrate has storage means. The storage means stores a set history of setting the state of the received informational signal and the state of output by the informational signal and an adjustment history of adjusting the quality of output by the informational signal. A manufacturer or the like collects this removable substrate that is detached from the information-processing device and can obtain any adjustment information on the quality of output at each state set by the setting means and the user, which corresponds to the user's preference, based on the stored contents in the storage means.

For example, the adjustment information on the quality of output includes a predictive adjustment value of the quality of output by the informational signal, which corresponds to each state set by the setting means. Further, the adjustment information on the quality of output may include information on an adjusting region of the quality of output, which corresponds to each state set by the setting means. This adjusting region may include a certain region apart from the predictive adjustment value as its almost center to both sides. When the adjustment information on the quality of output relates to the predictive adjustment value, the signal-processing means is controlled so that the quality of output can become the one corresponding to the predictive adjustment value of the state set by the setting means, thereby causing the quality of output to be so adjusted automatically as to be suitable to each individual user's preference. When the adjustment information on the quality of output is information on the adjusting region, the user can easily and surely adjust the quality of output to the one that is suited to each individual user's preference.

This adjustment information on the quality of output may be provided to the information-processing device, by using, for example, a memory card or the like. Alternatively, if the removable substrate has the first holding means for holding the predictive adjustment value and the second holding means for holding the restriction information, the removable substrate can provide the adjustment information on the quality of output with the information-processing device without using the memory card or the like.

For example, when the prescribed state is set in the setting means if the information-processing device or the removable substrate has controlling means for controlling the signal-processing means to obtain the quality of output that corresponds to the predictive adjustment value of the prescribed state, the predictive adjustment value being held in the first holding means of the removable substrate, the quality of output can be automatically adjusted to the one that is suited to each individual user's preference for every time when the prescribed state is set by the setting means.

For example, the signal-processing means includes data-selecting means for selecting multiple items of informational data based on the received informational signal, the multiple items of informational data being positioned around a target position in an output informational signal; coefficient-data-generating means for generating coefficient data of an estimate equation using coefficient seed data and the adjustment value by the adjusting means; and calculation means for calculating and obtaining informational data of the target position in the output informational signal based on the estimate equation using the multiple items of the informational data, which are selected in the data-selecting means, and the coefficient data, which is generated in the coefficient-data-generating means. In this case, the coefficient seed data corresponding to each state, which is set by the setting means, is generated using learning data of the quality of output within the adjusting region of the quality of output corresponding to each state. For example, the removable substrate further has a third holding means for holding such the coefficient seed data.

Additional features and advantages are described herein, and will be apparent from, the following Detailed Description and the figures.

BRIEF DESCRIPTION OF THE FIGURES

FIG. 9B shows an example of output image having a twofold zoom angle of the output image shown in FIG. 9A and FIG. 9C shows an example of output image having a threefold zoom angle of the output image shown in FIG. 9A;

FIG. 10A shows an example of output image having low-resolution and FIG. 10B shows an example of output image having high-resolution;

FIGS. 12A and 12B are diagrams for showing extraction processing of stored data, FIG. 12A shows the data stored in a storage unit and FIG. 12B shows the data extracted therefrom;

FIG. 14 is a diagram for illustrating how to calculate adjusting regions of resolution and noise reduction;

DETAILED DESCRIPTION

Figure 1:
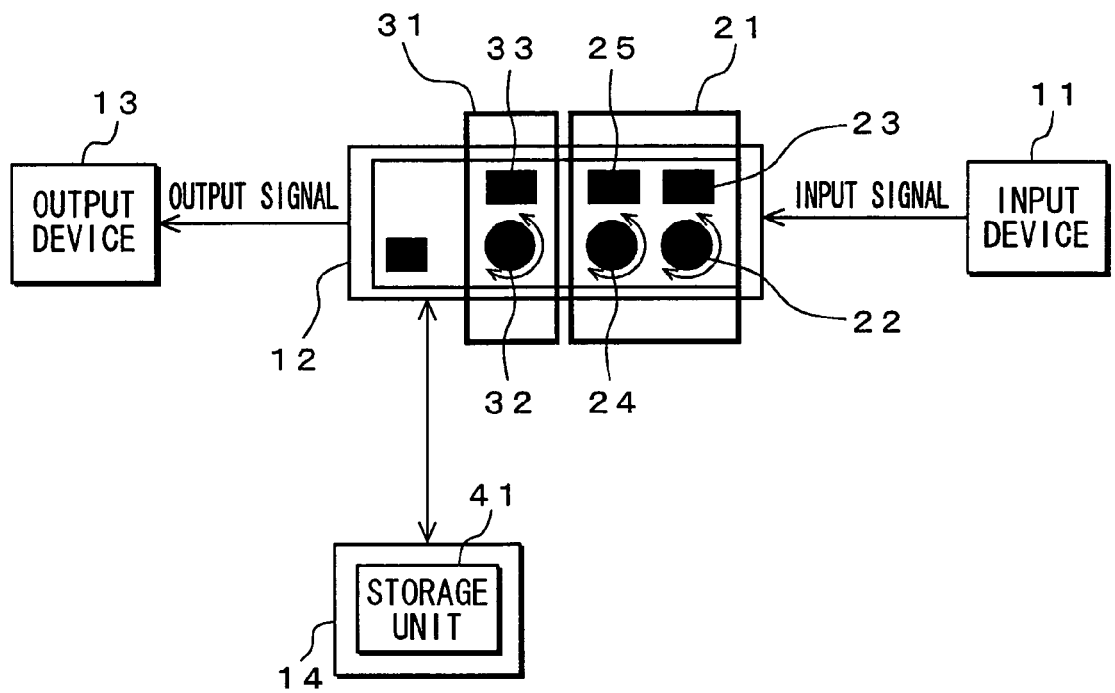
FIG. 1 is a block diagram for showing a basic configuration of an image-processing apparatus according to an embodiment of the invention.

An image processing apparatus according to embodiments of the invention will be described below with reference to the drawings. FIG. 1 shows a basic configuration of an embodiment of an image-processing apparatus. This image-processing apparatus 10 has an input device 11, an alteration device 12, an output device 13, and a removable substrate 14.

The input device 11 transmits an image signal to the alteration device 12 as an input signal. The alteration device 12 receives the image signal and processes the received image signal to transmit the processed signal to the output device 13 as an output signal. The output device 13 receives the processed signal and displays the image based on the processed signal.

The input device 11 includes a television tuner, a digital versatile disk (DVD) player, a video cassette recorder (VCR). A user can optionally set as a state of the received image signal a switching state of image signal source such as the television tuner, the DVD player, the VCR and the like as well as a switching state of broadcast channel in the television tuner.

The alteration device 12 has an image quality alteration unit 21 and a magnification alteration unit 31. The image quality alteration unit 21 has adjustment knobs 22 and 24. The user manipulates the adjustment knob 22 to adjust resolution so that an adjusted resolution value can be displayed on a displaying portion 23. Similarly, the user manipulates the adjustment knob 24 to adjust noise reduction so that a value of the adjusted noise reduction can be displayed on a displaying portion 25. The magnification alteration unit 31 has an adjustment knob 32. The user manipulates the adjustment knob 32 to adjust a zoom ratio (a zoom state) as a state of output by the image signal so that a value of the adjusted zoom ratio can be displayed on a displaying portion 33.

The removable substrate 14 is detachably connected to the alteration device 12 of which the information-processing device is composed. The removable substrate 14 has a storage unit 41. The storage unit 41 stores as history information control commands relative to at least a switch of the image signal source, a switch of broadcast channel, and alterations of zoom ratio, resolution, and noise reduction.

The following will describe operations of the image-processing apparatus 10. The input image signal transmitted from the input device 11 is supplied to the output device 13 through the alteration device 12 and the output device 13 displays the corresponding image. The user can manipulate the adjustment knob 32 to set a zoom ratio with him or her viewing this image if he or she wants to enlarge or reduce this image. The set zoom ratio is displayed on the displaying portion 33. The magnification alteration unit 31 performs enlargement or reduction processing on the image based on the image signal received from the input device 11 according to the set zoom ratio. The magnification alteration unit 31 then transmits the processed image signal to the output device 13. This allows the user to view the image having the zoom ratio set by himself or herself on the output device 13.

Similarly, the user can manipulate the adjustment knob 22 to adjust a resolution and the adjustment knob 24 to adjust a noise reduction. Values of the adjusted resolution and noise reduction are displayed on the displaying portions 23 and 25, respectively. The image quality alteration unit 21 performs, for example, resolution creation processing on the image signal received from the input device 11 using the adjusted resolution and noise reduction. The magnification alteration unit 31 then enlarges or reduces the image based on the set zoom ratio and supplies it to the output device. Thus, based on the user's set zoom ratio, the output device 13 can display the image on which the resolution creation processing is performed by using the resolution and noise reduction the user adjusts.

In the storage unit 41 of the removable substrate 14, control commands relative to the alteration of the zoom ratio, the alterations of the resolution and noise reduction, the switch of image signal source, the switch of broadcast channel and the like are stored as the history information.

A manufacturer or the like collects the removable substrate 14 so that adjustment information on the quality of output that corresponds to the user's preference at each state can be obtained on the basis of the stored contents in the storage unit 41. It is to be noted that "each state" is composed of a combination of a state of the received image signal and a zoom state of image by the image signal, which are altered with the switch of image signal source, the switch of broadcast channel, and the alteration of the zoom ratio.

For example, as adjustment information on the quality of output, a predictive adjustment value of the quality of output by the image signal, which corresponds to each state, such as a predictive adjustment value of the resolution or the noise reduction, can be obtained. Further, as adjustment information on the quality of output, information on adjusting region of the quality of output, which corresponds to each state, such as information on adjusting region of the resolution or the noise reduction can be obtained. This adjusting region becomes, for example, a set region apart from the predictive adjustment value as it is almost center to both sides.

How to calculate the predictive adjustment values of the resolution and noise reduction and the adjusting region thereof, which correspond to each state, will be described later.

The adjustment information on the quality of output (information on the predictive adjustment value of the resolution and noise reduction and information on the adjusting regions of the resolution and noise reduction) thus calculated, which corresponds to the user's preference, can be utilized in the alteration device 12 by providing the information with the alteration device 12 using card memory or the like. In this embodiment, however, the removable substrate 14 has a holding unit (not shown in FIG. 1) that holds the corresponding adjustment information on the quality of output. Such the information is provided to the alteration device 12 with it being held in the holding unit.

For example, when a prescribed state is set, the image quality alteration unit 21 is controlled so that the resolution creation process can be performed using resolution and noise reduction, which correspond to predictive adjustment values, which are held in the holding unit of the removable substrate 14, of the resolution and noise reduction of this prescribed state. This allows to be displayed the image on which the resolution creation processing using the resolution and noise reduction that are suited to the user's preference is performed.

For example, when a prescribed state is set, user's adjusting region are restricted according to the information on each of the adjusting regions of the resolution and noise reduction of the prescribed state, which are held in the holding unit of the removable substrate 14. This allows the user to easily and surely adjust the resolution and noise reduction to the ones the user prefers.

Figure 2:
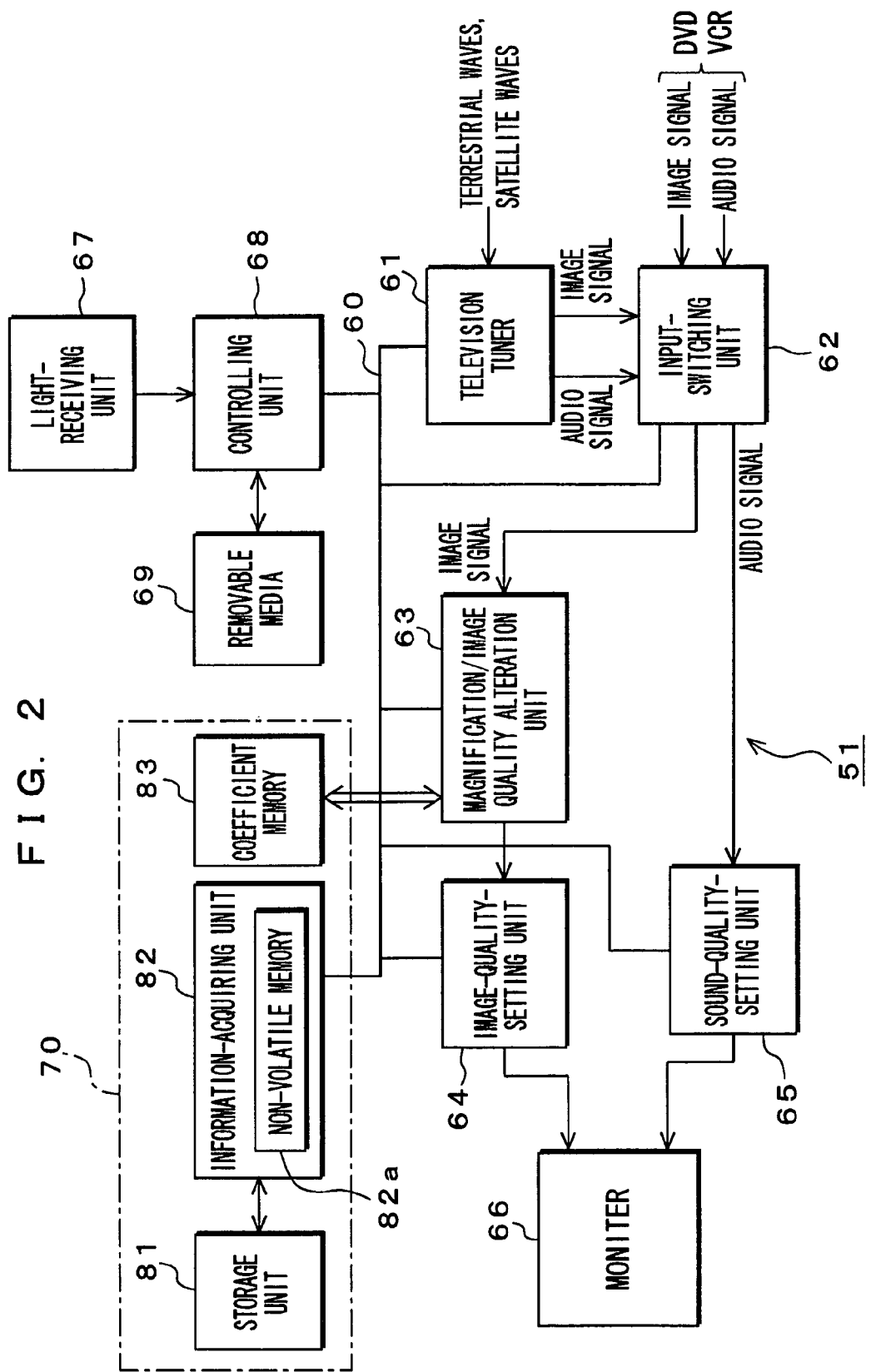
FIG. 2 is a block diagram for showing a specific configuration of an image-processing apparatus according to an embodiment of the invention.

FIG. 2 shows a specific configuration according to an embodiment of an image-processing apparatus. This image-processing apparatus (information-processing device) 51 has a television tuner 61, an input-switching unit 62, a magnification/image quality alteration unit 63, an image-quality-setting unit 64, a sound-quality-setting unit 65, a monitor 66, a light-receiving unit 67, a controlling unit 68, removable media 69, and a removable substrate 70. The removable substrate 70, which corresponds to the removable substrate 14 shown in FIG. 1, has a storage unit 81, an information-acquiring unit 82, and a coefficient memory 83. Such the units are connected to each other via a bus 60 so that necessary control commands can be supplied to each unit.

The television tuner 61 demodulates a broadcast signal from terrestrial waves or satellite waves received via an antenna, which is not shown, and transmits its image signal and audio signal to the input-switching unit 62. To the input-witching unit 62, DVD player, VCR or the like, which is not shown, also transmits an image signal and an audio signal. It is to be noted that the image signal source is composed of the television tuner 61, the DVD player, the VCR and the like.

Based on controls by the controlling unit 68, the input-switching unit 62 selects image and audio signals relative to a desired image signal source among the received image and audio signals, and supplies the selected image signal to the magnification/image quality alteration unit 63 as well as supplies the selected audio signal to the sound-quality-setting unit 65.

Based on controls by the controlling unit 68, the magnification/image quality alteration unit 63 alters magnification/image quality of the received image signal and transmits it to the image-quality setting unit 64. Namely, the magnification/image quality alteration unit 63 has a function corresponding to that of the alteration device 12 shown in FIG. 1. The magnification/image quality alteration unit 63 also performs image quality alteration processing of the resolution and noise reduction as well as zoom ratio alteration processing on the received image signal.

The image-quality-setting unit 64 sets any image quality such as brightness and hue other than those altered in the magnification/image quality alteration unit 63. The image signal in which its brightness, hue and the like is thus set by the image-quality-setting unit 64 is supplied to the monitor 66. The sound-quality-setting unit 65 adjusts and sets sound quality of the received audio signal based on the control commands of the controlling unit 68 and supplies it to the monitor 66. The monitor 66 displays an image corresponding to the received image signal and outputs sound corresponding to the received audio signal from a built-in speaker.

The controlling unit 68 is composed of, for example, a microcomputer. The light-receiving unit 67 receives an infrared light signal from a remote controller, which is not shown, and transmits to the controlling unit 68 a signal corresponding to the infrared light signal. The removable media 69 are equipped, if necessary, and supplies any programs and the like stored therein to the controlling unit 68. Based on the signal supplied from the light-receiving unit 67, the controlling unit 68 generates any corresponding control commands and transmits them to each unit via the bus 60.

The information-acquiring unit 82 of the removable substrate 70 is composed of, for example, a microcomputer and controls operations of the storage unit 81 and the magnification/image quality alteration unit 63 based on the control commands received through the bus 60. The storage unit 81 (corresponding to the storage unit 41 shown in FIG. 1) stores such the control commands acquired from the information-acquiring unit 82 as history information.

The information-acquiring unit 82 has a non-volatile memory 82a. This non-volatile memory 82a stores adjustment information on the quality of output (information on the predictive adjustment values of the resolution and noise reduction and information on adjusting regions of the resolution and noise reduction) at each above state (including a combination of a state of the received image signal and a zoom state of the image by the image signal, which are altered according to the switch of image signal source, the switch of broadcast channel, and alteration of the zoom ratio). This non-volatile memory 82a may have first and second holding portions.

When the control command relates to any of the switch of image signal source, the switch of broadcast channel, and alteration of the zoom ratio and a prescribed state thereof is set, the information-acquiring unit 82 reads the predictive adjustment values of resolution and noise reduction, which correspond to the prescribed state, out of the non-volatile memory 82a and transmits it to the magnification/image quality alteration unit 63. An image quality alteration unit of this magnification/image quality alteration unit 63 is controlled so that the resolution creation processing that corresponds to the predictive adjustment value of the resolution and noise reduction can be performed.

It is to be noted that this control may be also performed in the controlling unit 68 of the image-processing apparatus 51. In this case, when a prescribed state is set, the controlling unit 68 reads the predictive adjustment values of resolution and noise reduction, which correspond to the prescribed state, out of the non-volatile memory 82a and transmits it to the magnification/image quality alteration unit 63.

The coefficient memory 83 is composed of a non-volatile memory, and stores coefficient seed data, which is to be used in the image quality alteration unit of the magnification/image quality alteration unit 63, for each class at each state (including a combination of a state of the received image signal and a zoom state of the image by the image signal, which are altered according to the switch of image signal source, the switch of broadcast channel, and alteration of the zoom ratio).

Figure 3:
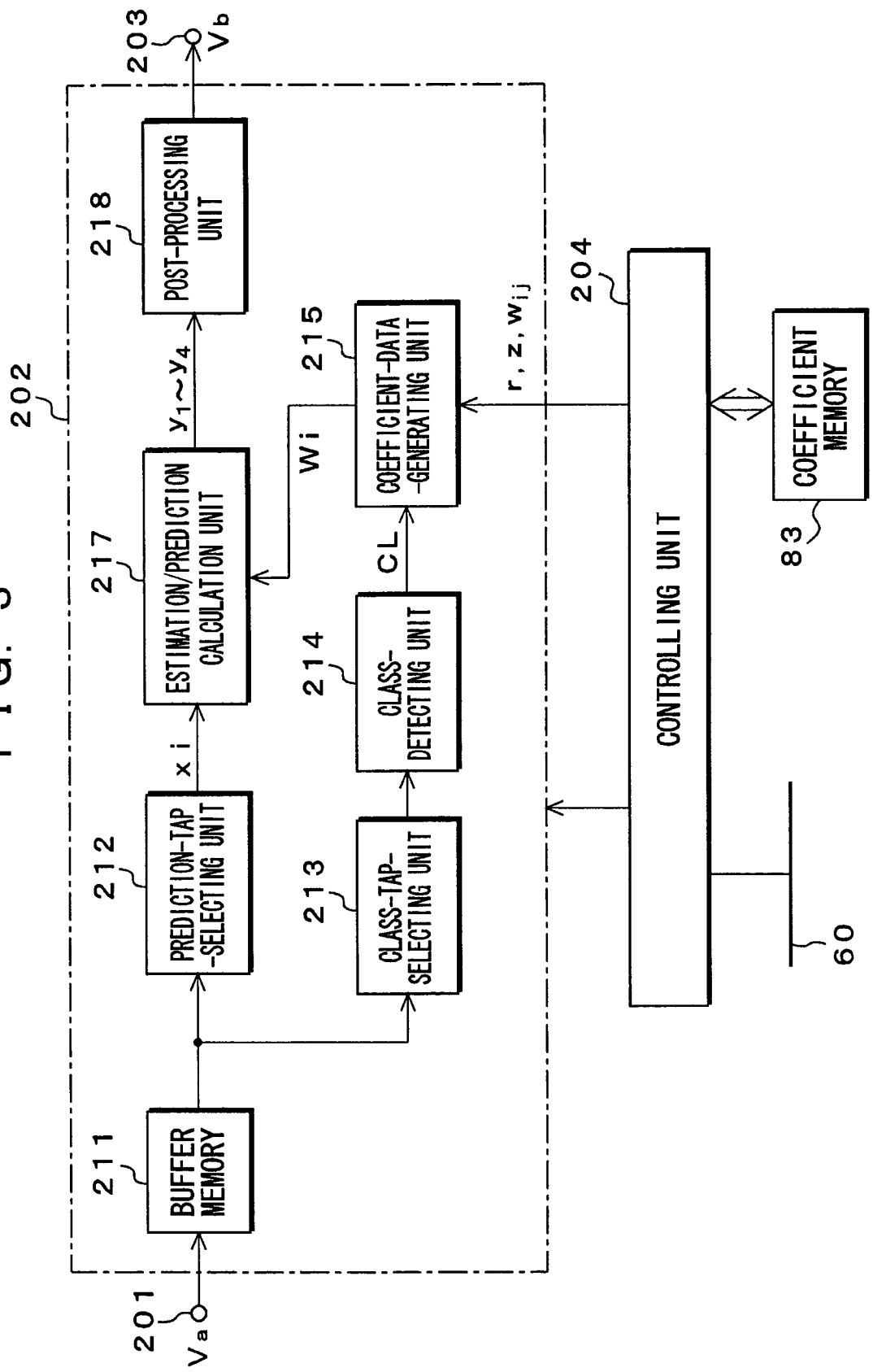
FIG. 3 is a block diagram for showing a configuration of an embodiment of an image quality alteration unit.

The following will describe a configuration of an image quality alteration unit of the magnification/image quality alteration unit 63. FIG. 3 shows a configuration of the image quality alteration unit.

This image quality alteration unit has a receiving terminal 201 for receiving an image signal Va, a processing unit 202 for processing the image signal Va received through the receiving terminal 201, a transmitting terminal 203 for transmitting an image signal Vb obtained by the processing unit 202, and a controlling unit 204 for controlling operations in the processing unit 202.

The controlling unit 204 controls the operations in the processing unit 202 based on the control commands or the like received through the bus 60. For example, the controlling unit 204 may have an MPU, an ROM storing operation program etc. of the MPU, an RAM constituting a working area for this MPU, and the like, which are not shown.

The processing unit 202 can convert the image signal Va, which is, for example, a standard definition (SD) signal of 525i signal, into the image signal Vb, which is, for example, a high definition (HD) signal of 1050i signal. The 525i signal relates to an interlaced image signal having 525 lines per one frame. The 1050i signal relates to an interlaced image signal having 1050 lines per one frame.

Figure 4:
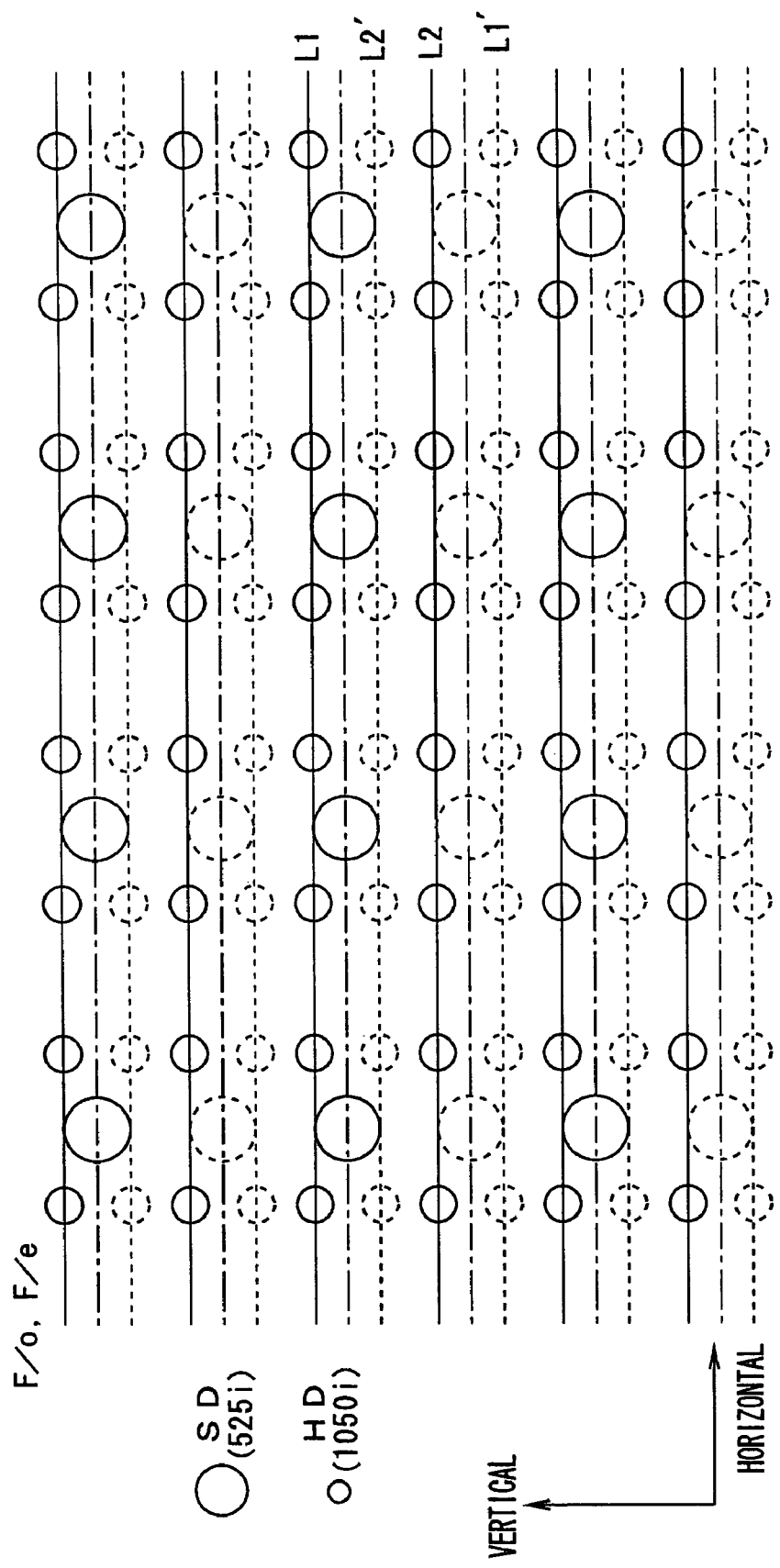
FIG. 4 is a diagram for showing a relationship of pixel positions between an SD signal and an HD signal.

FIG. 4 shows a relationship of pixel positions on frames (F) of the 525i signal and the 1050i signal in which pixel positions on odd fields are illustrated as solid lines and pixel positions on even fields are illustrated as dotted lines. Large circular representations illustrate pixels of the 525i signal and small circular representations illustrate pixels of the 1050i signal. As shown in FIG. 4, as pixel data of the 1050i signal, there are items of line data L1 and L1' that are near the line of 525i signal and items of line data L2 and L2' that are away from the line of 525i signal. It is to be noted that L1 and L2 indicate items of the line data of odd fields and L1' and L2' indicate items of the line data of even fields. The numbers of pixels in each line of the 1050i signal are twice the numbers of pixels in each line of the 525i signal.

Referring back to FIG. 3, the processing unit 202 has a buffer memory 211, a prediction-tap-selecting unit 212 and a class-tap-selecting unit 213. The buffer memory 211 temporarily stores the image signal Va received from the receiving terminal 201. The tap-selecting units 212 and 213 respectively extract multiple items of pixel data that are positioned around a target position in the image signal Vb selectively as the prediction tap data and class tap data, respectively, based on the image signal Va stored in the buffer memory 211.

Figure 5A:
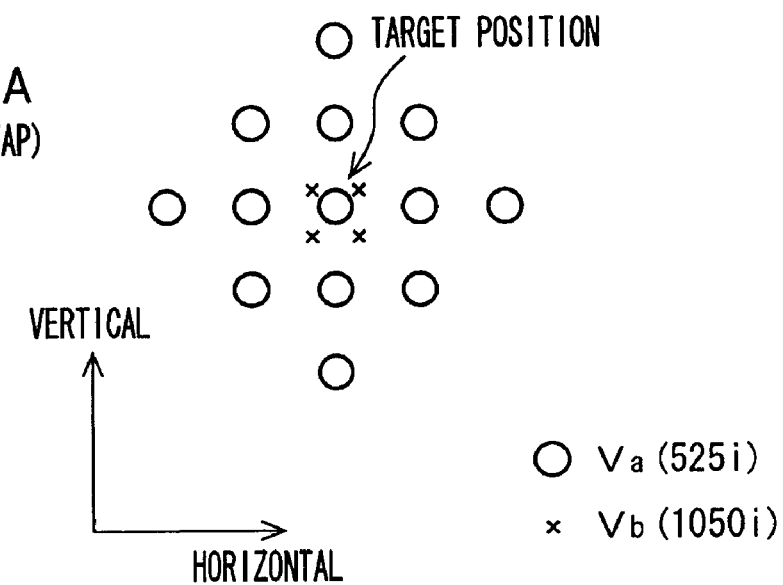
FIGS. 5A and 5B are diagrams each for illustrating a pattern of a prediction tap and a class tap.
Figure 5B:
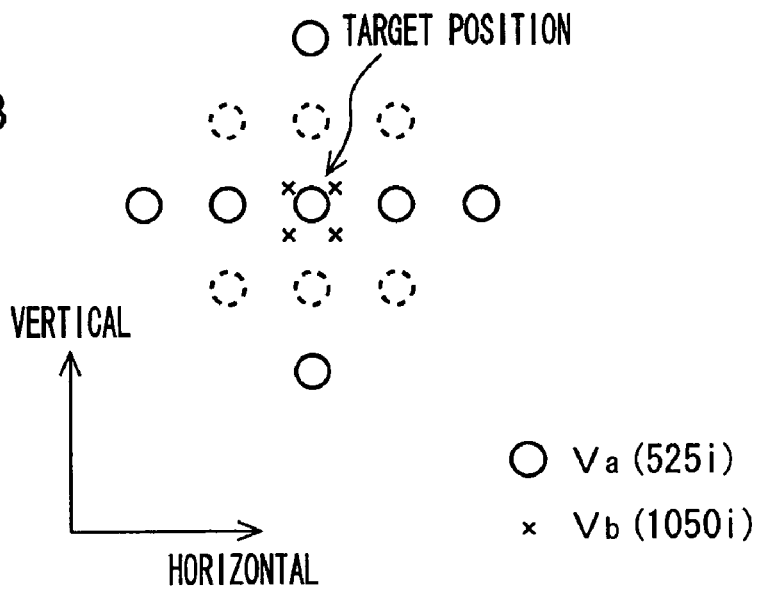

FIG. 5A illustrates a pattern example of multiple items of pixel data that are extracted as the prediction tap data. FIG. 5B illustrates a pattern example of multiple items of pixel data (a part shown by solid line) that are extracted as class tap data. Although in FIGS. 5A and 5B, the items of pixel data as the prediction tap data and class tap data are extracted from a present field in which the target position stays, they can be extracted from a prescribed number of fields that are positioned before or after along a time direction thereof.

The processing unit 202 also has a class-detecting unit 214. The class-detecting unit 214 performs data compression processing on the items of pixel data as the class tap data that are extracted by the class-tap-selecting unit 213 to obtain a class code CL indicating a class to which pixel data of the target position in the image signal Vb belongs. For example, as the data compression processing, adaptive dynamic range coding (ADRC), differential pulse code modulation (DPCM), vector quantization (VQ) and the like can be used. In this embodiment, ADRC, for example, one-bit ADRC is used.

The following will describe a case where K-bit ADRC is used. In this case, a dynamic range DR=MAX−MIN that is difference between maximum value MAX of the pixel data included in the class tap and minimum value MIN thereof is detected. Concerning respective items of pixel data included in the class tap, the minimum value MIN is subtracted from the pixel data and the subtracted value is divided by $DR/2^K$ (namely, quantized). Respective items of pixel data constituting the class tap are then re-quantized to K bits. A bit stream in which the re-quantized ones are arranged along a prescribed order is set as the class code CL.

Therefore, if using the one-bit ADRC, concerning respective items of pixel data included in the class tap, the minimum value MIN is subtracted from the pixel data and the subtracted value is divided by DR/2. Respective items of pixel data included in the class tap are then re-quantized to one bit and a bit stream in which the re-quantized ones are arranged along a prescribed order is set as the class code CL and output.

The processing unit 202 further has a coefficient-data-generating unit 215. A estimation/prediction calculation unit 217, which is described later, calculates pixel data y of the target position in the image signal Vb based on the following estimate equation (1) using multiple items of pixel data xi as the prediction tap and the coefficient data Wi:

$$y = \sum_{i=1}^{n} Wi\,xi \quad (1)$$

where n indicates numbers of the multiple items of pixel data xi as the prediction tap.

The coefficient seed data hold on the above coefficient memory 83 is coefficient data of a productive equation for producing coefficient data Wi for the above estimate equation. The productive equation includes parameters r and z for adjusting image quality. A following equation (2) shows an example of the productive equation:

$$Wi = w_{i0} + w_{i1}r + w_{i2}z + w_{i3}r^2 + w_{i4}rz + w_{i5}z^2 + w_{i6}r^3 + w_{i7}r^2z + w_{i8}rz^2 + w_{i9}z^3 \quad (2)$$

where Wij indicates the coefficient seed data. The parameter r is a parameter that is used for setting resolution. The parameter z is a parameter that is used for setting noise reduction. The coefficient seed data Wij is information on conversion from the image signal Va (525i signal) into the image signal Vb (1050i signal).

If 525i signal is converted into 1050i signal as shown in FIG. 4, it is necessary to obtain four pixels of 1050i signal relative to one pixel of 525i signal in each of the odd fields and even fields.

Figure 6:
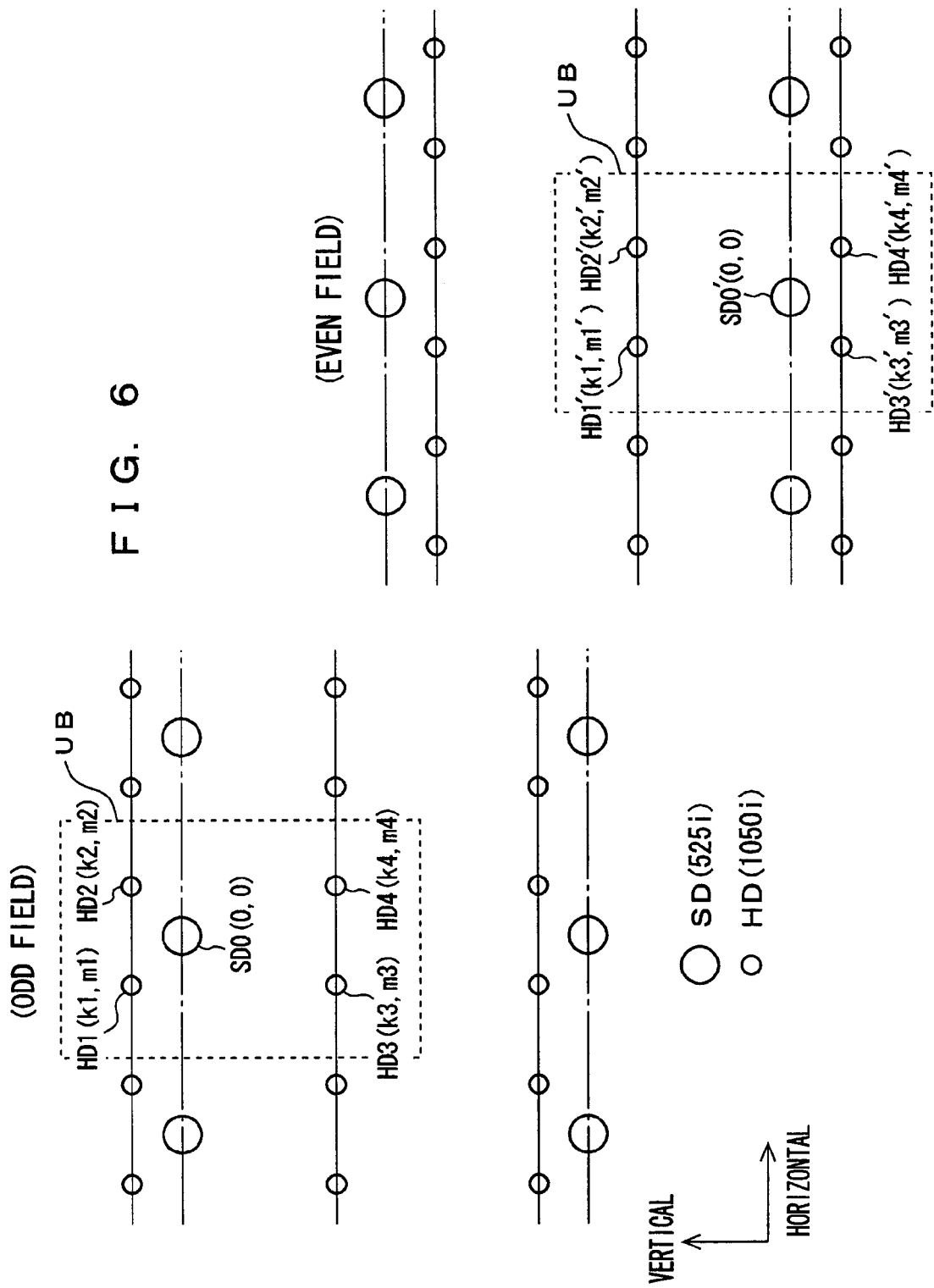
FIG. 6 is a diagram for showing phase lags of four pixels of HD signal in a unit pixel block behind a central prediction tap.

FIG. 6 shows a phase lag of four pixels constituting 1050i signal in a unit pixel block UB of 2*2 pixels in each of the odd and even fields behind a central prediction tap. If the odd field, positions of four pixels HD1 through HD4 in the unit pixel block UB are respectively shifted by certain intervals (k1 through k4 in a horizontal direction and m1 through m4 in a vertical direction) from a position SD0 of the central prediction tap. If the even field, positions of four pixels HD1' through HD4' in the unit pixel block UB are respectively shifted by certain intervals (k1' through k4' in a horizontal direction and m1' through m4' in a vertical direction) from a position SD0' of the central prediction tap.

Thus, the coefficient seed data Wij of each class as described above is composed of items of the coefficient seed data Wij each corresponding to eight species of output pixels (HD1 through HD4 and HD1' through HD4'). The coefficient memory 83 stores the coefficient seed data Wij for each combination of class and output pixel.

This coefficient seed data Wij has been previously produced by a learning of an image signal Vb', as a teacher signal, which corresponds to the image signal Vb, and an image signal Va', as a student signal, which corresponds to the image signal Va. How to calculate such the coefficient seed data Wij will be described more in detail later.

The coefficient-data-generating unit 215 acquires from the coefficient memory 83 items of the coefficient seed data Wij of four pixels, which correspond to the four output pixels (HD1 through HD4 and HD1' through HD4' shown in FIG. 6), respectively, of the class indicated by the class code CL that has been obtained in the class-detecting unit 214 in each of the odd and even fields. The coefficient-data-generating unit 215 then generates the coefficient data Wi of four pixels based on the above production equation (2) using the parameters r and z for adjusting image quality, which are supplied from the controlling unit 204.

It is to be noted that the coefficient seed data Wij obtained from the coefficient memory 83 is the coefficient seed data Wij corresponding to a present switching state of image signal source, a present switching state of broadcast channel in the television tuner 61, a present zoom state by zoo ratio. The values of the parameters r and z to be supplied from the controlling unit 204 to the coefficient-data-generating unit 215 are as follows. Namely, when they are set to a prescribed state by the switch of image signal source, the switch of broadcast channel, and alteration of zoom ratio, these values are set to predictive adjustment values of the resolution and noise reduction, which are sent from the information-acquiring unit 82 as described above. If the values of the resolution and noise reduction are adjusted by user's manipulation, they are set to the adjusted values of resolution and noise reduction.

When the user adjusts the resolution and noise reduction with his or her manipulation, the controlling unit 204 obtains information on an adjusting region corresponding to the present state from the non-volatile memory 82a of the information-acquiring unit 82 via the bus 60 so that adjusting regions of the resolution and noise reduction by the user can be restricted on the basis of the this information on the adjusting region. For example, this adjusting region is restricted to a set region apart from each of the predictive adjustment value of the resolution and noise reduction as their almost center to both sides.

The processing unit 202 additionally has an estimation/prediction calculation unit 217. This estimation/prediction calculation unit 217 calculates pixel data for each unit pixel block UB in which the target position of the image signal Vb stays. Namely, the estimation/prediction calculation unit 217 separately calculates items of the pixel data $y_1$ through $y_4$ of four pixels constituting this unit pixel block UB according to the above estimate equation (1) by using the pixel data xi of prediction tap, which corresponds to four pixels (target pixels) in the unit pixel block UB and is extracted by the prediction-tap-selecting unit 212 and the coefficient data Wi of four pixels, which corresponds to four pixels in the unit pixel block UB and is generated in the coefficient-data-generating unit 215.

The processing unit 202 further has a post-processing unit 218. The post-processing unit 218 linear-serializes the items of pixel data $y_1$ through $y_4$, of four pixels in the unit pixel block UB, which are serially transmitted from the estimation/prediction calculation unit 217 and outputs them as 1050i signal.

The following will describe operations of the image quality alteration unit shown in FIG. 3.

The receiving terminal 201 receives the image signal Va having SD format. The buffer memory 211 then temporarily stores the image signal Va. Based on the image signal Va, any classification adaptation processing is performed to generate each of the items of pixel data constituting the image signal Vb.

Namely, the class-tap-selecting unit 213 selectively extracts multiple items of the pixel data, as class tap data, which are positioned around the target position in the image signal Vb, based on the image signal Va stored on the buffer memory 211. These items of pixel data are supplied to the class-detecting unit 214.

The class-detecting unit 214 performs data-compression processing of, for example, one-bit ADRC on the items of the pixel data as the class tap data to obtain the class code CL indicating a class to which the pixel data of the target position in the image signal Vb belongs. This class code CL is supplied to the coefficient-data-generating unit 215.

This coefficient-data-generating unit 215 obtains from the coefficient memory 83 the coefficient seed data Wij (wi0 through wi9 in this embodiment) of four pixels, which respectively correspond to the four output pixels (HD1 trough HD4 and HD1' trough HD4' shown in FIG. 6) of the class indicated by the class code CL in each of the odd and even fields. The coefficient-data-generating unit 215 also obtains the parameters, r and z, for adjusting image quality from the controlling unit 204. The coefficient-data-generating unit 215 then generates the coefficient data Wi of four output pixels based on the above production equation (2) using values of the coefficient seed data, wi0 through wi9, of four pixels and the parameters r and z for adjusting image quality, in each field. This coefficient data Wi is supplied to the estimation/prediction calculation unit 217.

The prediction-tap-selecting unit 212 selectively extracts multiple items of the pixel data xi, which are positioned around the target position in the image signal Vb, as the prediction tap data, based on the image signal Va stored in the buffer memory 211. The items of the pixel data xi are also supplied to the estimation/prediction calculation unit 217.

The estimation/prediction calculation unit 217 separately calculates items of the pixel data, $y_1$ through $y_4$, of four pixel (relative to the target position) in the unit pixel block UB in which the target position of the image signal Vb stays based on the above estimate equation (1) using the multiple items of pixel data xi extracted in the prediction-tap-selecting unit 212 as the prediction tape data and the coefficient data Wi of four output pixels that is generated in the coefficient-data-generating unit 215.

The items of the pixel data, y1 through y4, of four pixels in each unit pixel block UB constituting the image signal Vb are serially transmitted from the estimation/prediction calculation unit 217 and supplied to the post-processing unit 218. This post-processing unit 218 linear-serializes the items of pixel data, y1 through y4, of four pixels in the unit pixel block UB, which are serially supplied from the estimation/prediction calculation unit 217 and outputs them as 1050i signal. Thus, the post-processing unit 218 can obtain the image signal Vb (1050i signal) and this image signal Vb is output through the transmitting terminal 203.

Figure 7:
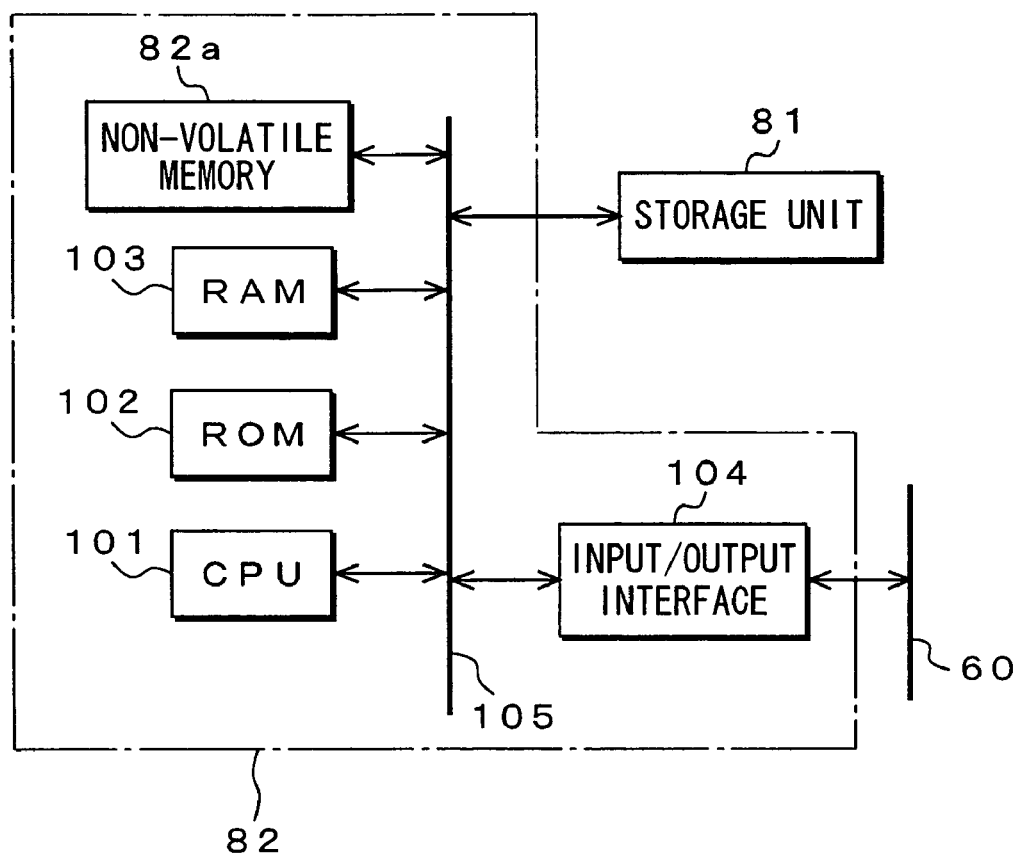
FIG. 7 is a block diagram for showing a configuration of an embodiment of an information-acquiring unit of the removable substrate.

FIG. 7 shows a configuration of the information-acquiring unit 82 of the removable substrate 70. This information-acquiring unit 82 has CPU 101, ROM 102, RAM 103, a non-volatile memory 82a, and an input/output interface 104, which are connected to each other via a bus 105. The ROM 102 stores operation programs of the CPU 101 or the like. The RAM 103 is composed of a working area for the CPU 101. The non-volatile memory 82a stores adjustment information on quality of output at each state, as described above. The input/output interface 104 performs input/output interface processing from and to the bus 60.

The following will describe operations of the image-processing apparatus 51 shown in FIG. 2.

When the user manipulates the remote controller to command a reception of, for example, television broadcast signal of desired channel, the light-receiving unit 67 receives the infrared signal corresponding to this command and the signal corresponding to it is then supplied to the controlling unit 68. Based on this signal, the controlling unit 68 transmits to the television tuner 61 via the bus 60 a control command for commanding the television tuner 61 to receive the broadcast signal of the desired channel. When receiving this control command, the television tuner 61 receives the broadcast signal of the desired channel and de-modulates it to transmit the image signal and the audio signal thereof to the input-switching unit 62. Since the controlling unit 68 has received the control command for commanding the television tuner 61 to receive the broadcast signal, the controlling unit 68 also transmits a control command for selecting output of the television tuner 61 to the input-switching unit 62 via the bus 60. Based on this control command, the input-switching unit 62 selects the image signal and the audio signal that are supplied from the television tuner 61, and the selected image signal is supplied to the magnification/image quality alteration unit 63 as well as the selected audio signal is supplied to the sound-quality-setting unit 65.

The magnification/image quality alteration unit 63 transmits the received image signal to the image-quality-setting unit 64 as it is if any alteration of magnification and image quality is not specified. The image-quality-setting unit 64 adjusts and sets brightness and hue of the image signal received from the magnification/image quality alteration unit 63 to their specified values based on the control command received from the controlling unit 68 via the bus 60 and transmits the adjusted and set image signal to the monitor 66. The sound-quality-setting unit 65 adjusts and sets sound quality of the audio signal received from the input-switching unit 62 based on the control command received from the controlling unit 68 via the bus 60 and transmits the adjusted and set audio signal to the monitor 66.

Thus, from the monitor 66, the image and audio of the television broadcast of the specified channel is output.

If the user manipulates the remote controller to command alteration of the resolution, the noise reduction or the zoom ratio, the controlling unit 68 controls the magnification/image quality alteration unit 63 through the bus 60. Based on the control, the magnification/image quality alteration unit 63 produces an image signal on which the enlargement or reduction processing is performed according to the altered zoom ratio as well as performs the resolution creation processing by which the altered resolution and/or noise reduction are satisfied. This allows the monitor 66 to display the image that is enlarged or reduced at the user's specified zoom ratio and is resolution-creation-processed on the user's specified resolution and noise reduction.

In this case, in the magnification/image quality alteration unit 63, the adjusting regions of the resolution and noise reduction are restricted based on the state of the received image signal and the zoom state of the image by the image signal that is displayed on the monitor 66. This restriction in the adjusting regions is performed based on the information on the adjusting regions stored in the non-volatile memory 82a of the information-acquiring unit 82. If the non-volatile memory 82a of the information-acquiring unit 82 thus stores the information on the adjusting regions, which corresponds to the user's preference, at each state (including a combination of a state of the received image signal and a zoom state of image by the image signal, which are altered by the switch of image signal source, the switch of broadcast channel and the alteration of zoom ratio), the user can easily and surely adjust the resolution and the noise reduction thereof to the preferred values.

If the user manipulates the remote controller to command an alteration of the channel in the television tuner 61 or a switch of the image signal source to be selected in the input-switching unit 62, a state of image signal to be supplied to the magnification/image quality alteration unit 63 is altered. If the user manipulates the remote controller to command an alteration of the zoom ratio, a zoom state of the image by the image signal that the monitor 66 displays is altered.

When such the states are altered, the information-acquiring unit 82 of the removable substrate 70 transmits to the magnification/image quality alteration unit 63 via the bus 60 predictive adjustment values of the resolution and noise reduction that correspond to the altered states. The magnification/image quality alteration unit 63 performs the resolution creation processing that satisfies the received predictive adjustment values of the resolution and noise reduction. This allows the monitor 66 to display the image on which the resolution creation processing of the resolution and noise reduction is performed corresponding to the altered states.

If the non-volatile memory 82a of the information-acquiring unit 82 stores the predictive adjustment values of the resolution and the noise reduction that correspond to the user's preference at each state, the resolution and noise reduction of the image that the monitor 66 displays in their altered states are automatically suitable for the user's preference. Namely, in this case, it is possible to provide the resolution and the noise reduction corresponding to the altered states, which are suited to the user's preference, without any help from the user.

Figure 8:
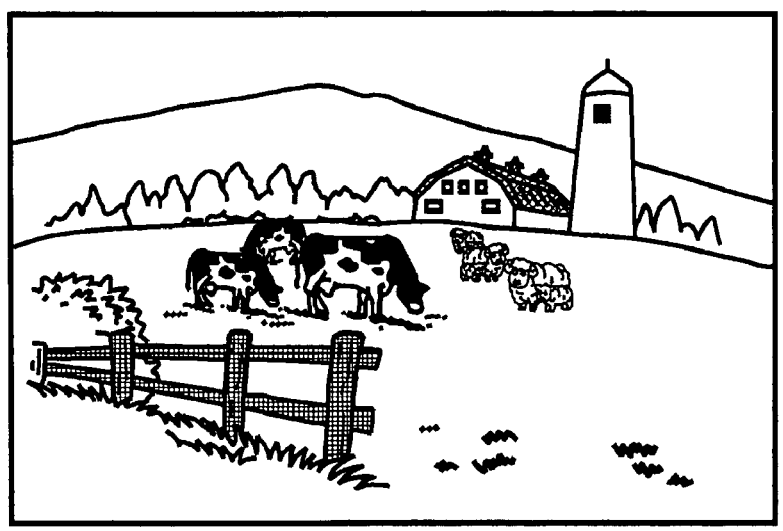
FIG. 8 is a diagram for showing an example of input image.
Figure 9A:
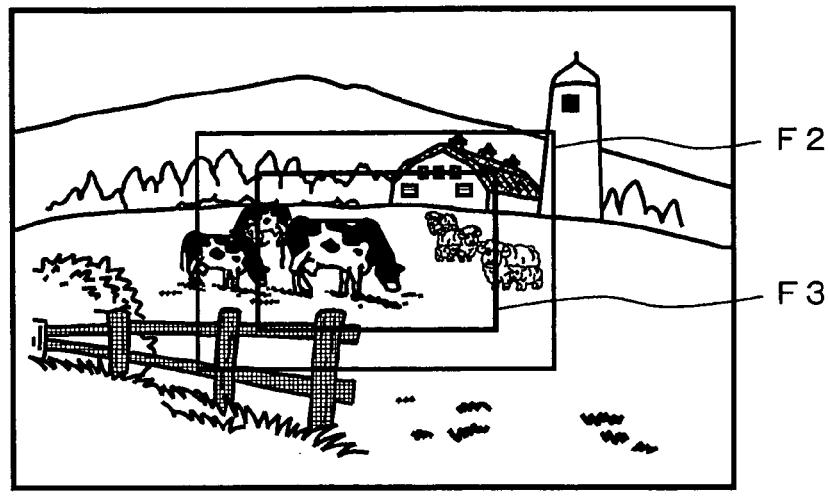
FIGS. 9A through 9C are diagrams each for showing an example of output image, particularly
Figure 9B:
Figure 9C:
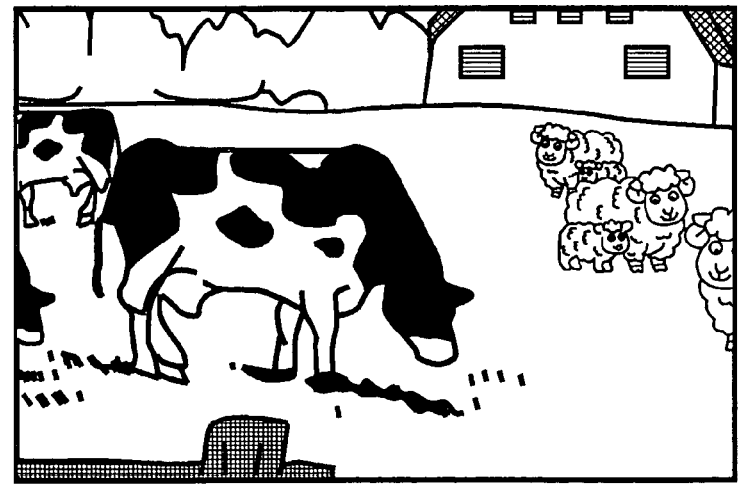

The following will describe a case where the television tuner 61 receives the image shown in FIG. 8. If the user specifies the zoom ratio of 1:1, 2:1 or 3:0, the images shown in FIGS. 9A, 9B and 9C can be displayed, respectively, on the monitor 66. Namely, if the user specifies the zoom ratio of 2:1, the image of a frame F2 shown in FIG. 9A, which has twice zoom angle of the image of FIG. 9A, can be enlarged and displayed as shown in FIG. 9B. If the user specifies the zoom ratio of 3:1, the image of a frame F3 shown in FIG. 9A, which has threefold zoom angle of the image of FIG. 9A, can be enlarged and displayed as shown in FIG. 9C.

Figure 10A:
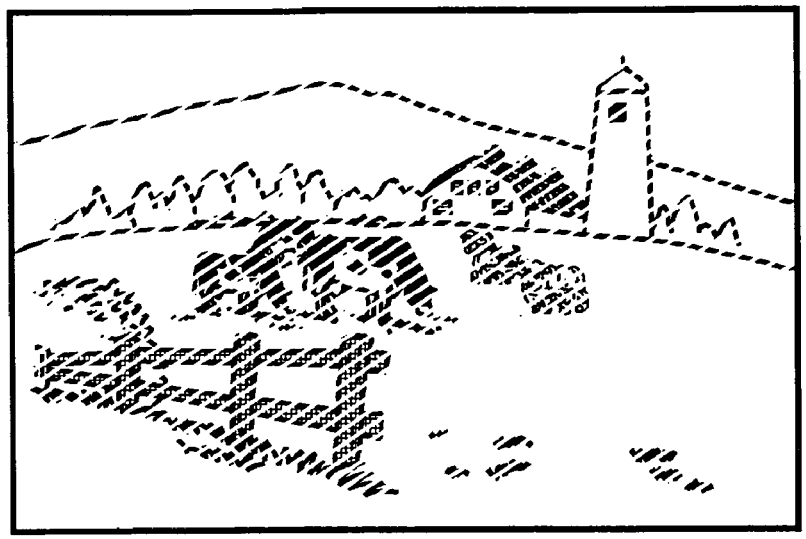
FIGS. 10A and 10B are diagrams each for showing an example of output image.
Figure 10B:
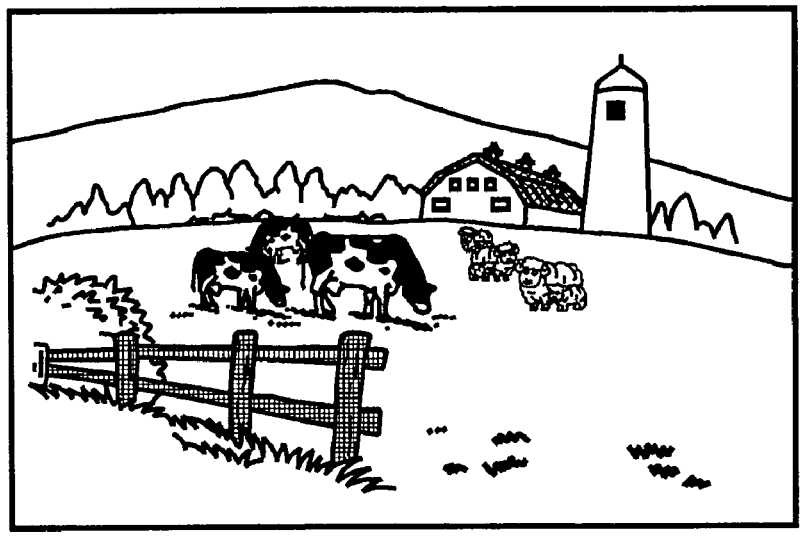

Concerning each zoom ratio, the resolution and noise reduction of each of the images can be automatically suited to the user's preference. FIGS. 10A and 10B show examples of the images that are automatically adjusted in their resolution if the user specifies the zoom ratio of 1:1. FIG. 10A shows an example of the image having its resolution adjusted to a relative low value and FIG. 10B shows an example of the image having its resolution adjusted to the value higher than that low value.

Figure 11:
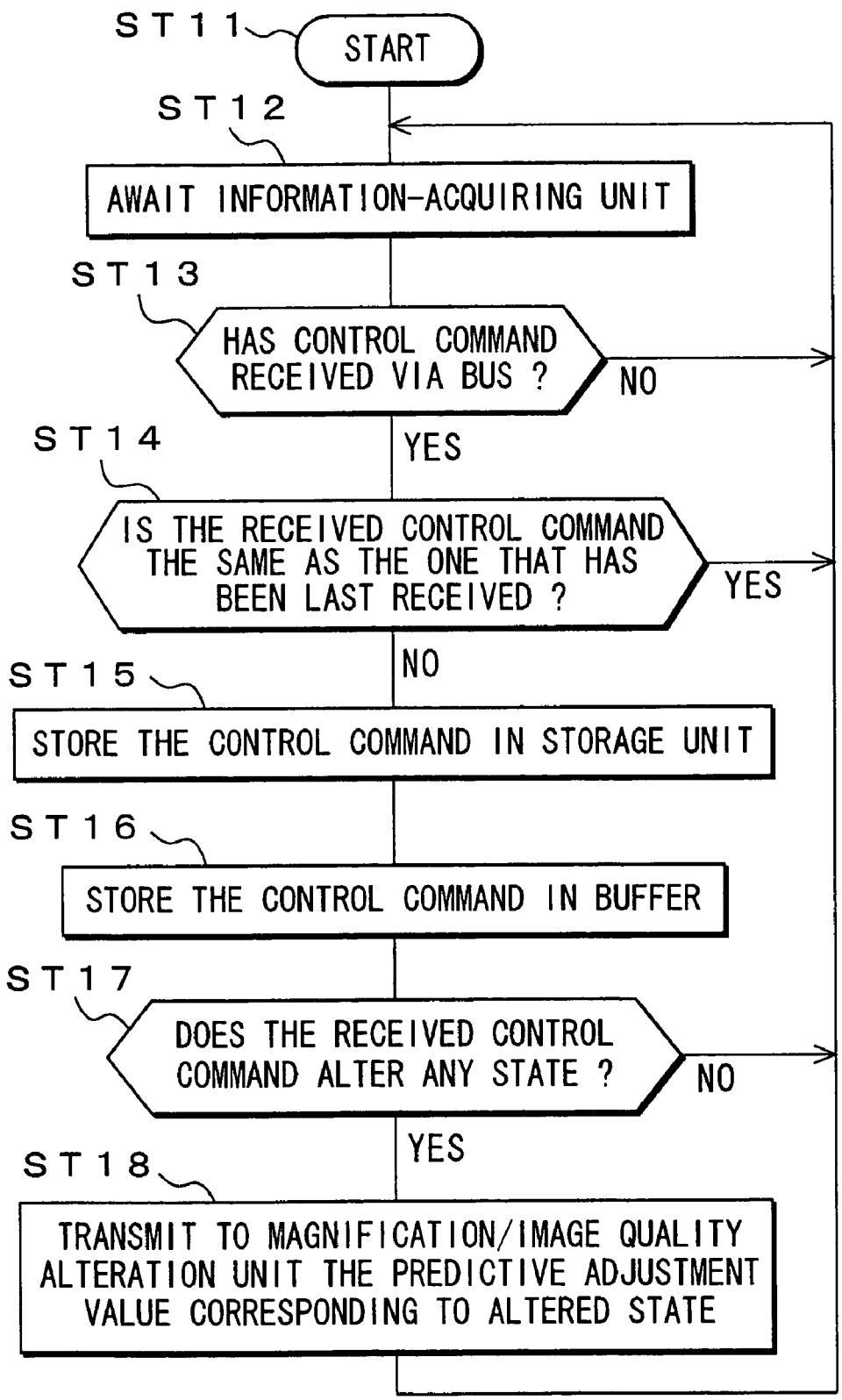
FIG. 11 is a flowchart for showing operations of an embodiment of the information-acquiring unit.

In the removable substrate 70, the information-acquiring unit 82 accumulates in the storage unit 81 the control commands, which are received through the bus 60, step by step. Fig. 11 is a flowchart for showing operations of the information-acquiring unit 82.

At step ST11, the process starts. At step ST12, the information-acquiring unit 82 is awaited and the process goes to step ST13 where it is determine whether a control command has been received through the bus 60. If not received, the process goes back to the step ST12 where the information-acquiring unit 82 is awaited.

If received, the process goes to step ST14 where it is determined whether the received control command is the same as the one that has been last received. This determination is performed by comparing the received control command with the one stored in the buffer (provided for the RAM 103).

If the received control command is the same, the process goes back to the step ST12 where the unit 82 is awaited. If the received control command is not the same, the process goes to step ST15. At the step ST15, the received control command is stored in the storage unit 81. At step ST16, the received control command is stored in the buffer so that it can be used at the step ST14.

At step ST17, it is determined whether the received control command relates to a switch of image signal source, a switch of broadcast channel or an alteration of zoom ratio and alters any state (a state of the received image signal and a zoom state of image). If the received control command does not relate to them nor alter any state, the process goes back to the step ST12 where the unit 82 is awaited.

If the received control command relates to them and alters any state, the process goes to step ST18. At the step ST18, a predictive adjustment value of the resolution and noise reduction corresponding to the altered state is read out of the non-volatile memory 82a and the read adjustment value is then transmitted to the magnification/image quality alteration unit 63. The process then goes back to the step ST12 where the unit 82 is awaited.

The following will describe how to calculate a predictive adjustment value of the resolution and noise reduction corresponding to the user's preference at each state (including a combination of a state of the received image signal and a zoom state of image by the image signal, which are altered according to the switch of image signal source, the switch of broadcast channel or the alteration of zoom ratio).

First, data on zoom ratios and values of the resolution and noise reduction, which correspond to each state of the received image signals, is extracted from the storage unit 81.

FIGS. 12A and 12B respectively show an example of this extraction processing. FIG. 12A shows an example of the data (control commands) stored in the storage unit 81. If a state such that the received image signal is an image signal of 8 channels transmitted from the television tuner 61 is selected, items of the data (on the zoom ratio, the values of resolution and noise reduction) relative to, for example, the channel 8, which are shown using frames in FIG. 12B, are extracted one after another from the storage unit 81. If another state in the received image signal is selected, the data is similarly extracted therefrom.

Next, at each state of the received image signal, the data extracted from the storage unit 81 is classified for each zoom ratio. This allows a group of data on the values of the resolution and noise reduction to be obtained for each combination of the state of the received image signal and the zoom ratio (the zoom state) of image.

For each combination as described above, a weighted center of plural resolution values included in the group of data is then obtained and this weighted center is set to a predictive adjustment value of the resolution. Similarly, for each combination as described above, a weighted center of plural noise reduction values included in the group of data is obtained and this weighted center is set to a predictive adjustment value of the noise reduction. It is to be noted that when calculating each of the weighted centers of the values of the resolution and noise reduction, they are weighted based on, for example, dates.

Figure 13:
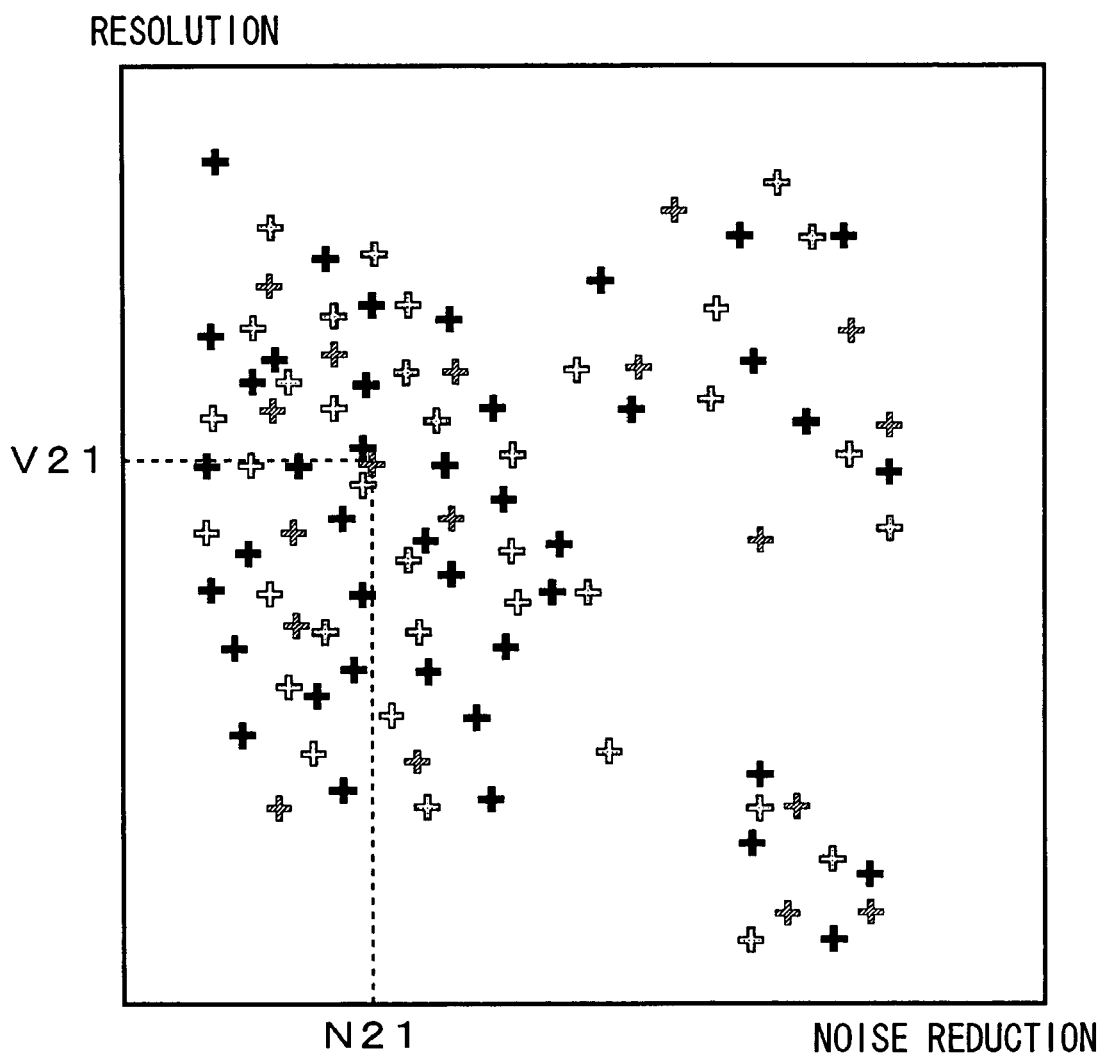
FIG. 13 is a diagram for illustrating how to calculate predictive adjustment values of resolution and noise reduction.

FIG. 13 shows a group of data of the values of the resolution and noise reduction at a combination thereof. In FIG. 13, the darker, the marks denote newer data in time while the lighter, the marks denote older data in time. In this case, the darker new data is weighted by using a larger coefficient to calculate weighted centers of the resolution and noise reduction. In FIG. 13, a term, "V21" denotes a weighted center of the resolution as a result of the calculation thereof and this weighted center is set to a predictive adjustment value of the resolution. A term, "N21" denotes a weighted center of the noise reduction as a result of the calculation thereof. This weighted center is set to a predictive adjustment value of the noise reduction.

The following will describe how to calculate adjusting regions of the resolution and noise reduction corresponding to the user's preference relative to each state (including a combination of a state of the received image signal and a zoom state of image by the image signal, which are altered according to the switch of image signal source, the switch of broadcast channel or the alteration of zoom ratio).

First, predictive adjustment values of resolution and noise reduction corresponding to the user's preference at each state are obtained as described above. For each state, each of the adjusting regions of the resolution and noise reduction is set to a set region apart from each of the predictive adjustment values of the resolution and noise reduction as their almost center to both sides.

For example, it is supposed that, as shown in a coordinate region A1 of FIG. 14, an adjustment value by the user, if the resolution is set to an adjustment region between 40 and 150 and the noise reduction is set to an adjustment region between 70 and 120, is shifted toward a smaller resolution side and a larger noise reduction, so that the predictive adjustment value of resolution V21 can be obtained as being 65 and the predictive adjustment value of noise reduction N21 can be obtained as being 105. In this moment, as shown in a coordinate region A2 of FIG. 14, each of the adjusting regions of the resolution and noise reduction is set to a set region apart from each of the predictive adjustment values (65 and 105) of the resolution and noise reduction as their almost center to upper and lower sides, so that the adjusting region of resolution can be obtained as to be 20 to 130 and that of the noise reduction can be obtained as to be 80 to 130. By using these adjusting regions thus obtained, the user can adjust the resolution value to smaller one or the noise reduction value to larger one. Thus, the user can easily and surely adjust the resolution and noise reduction to the ones that are suited to the user's preference.

Figure 15:
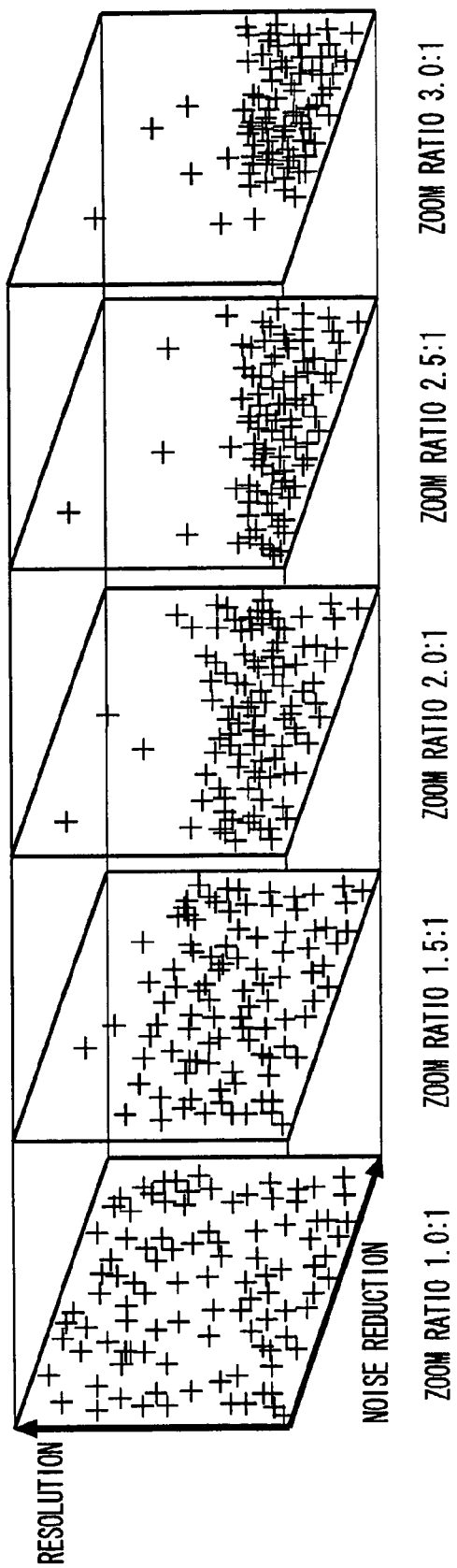
FIG. 15 is a diagram for showing a relationship of user's adjustment values of resolution and noise reduction relative to each of the zoom ratios.

FIG. 15 shows a distribution example of user's adjustment values (indicated in FIG. 15 as symbols "+") of the resolution and noise reduction relative to each of the zoom ratios if the adjusting regions of the resolution and noise reduction are fixed regardless of any zoom ratio. In this case, the larger the zoom ratio, the user's adjustment value of the resolution is shifted toward the smaller value side thereof and that of the noise reduction is shifted toward the larger value side thereof. This causes the user's adjusting region to be made substantially narrower.

Figure 16:
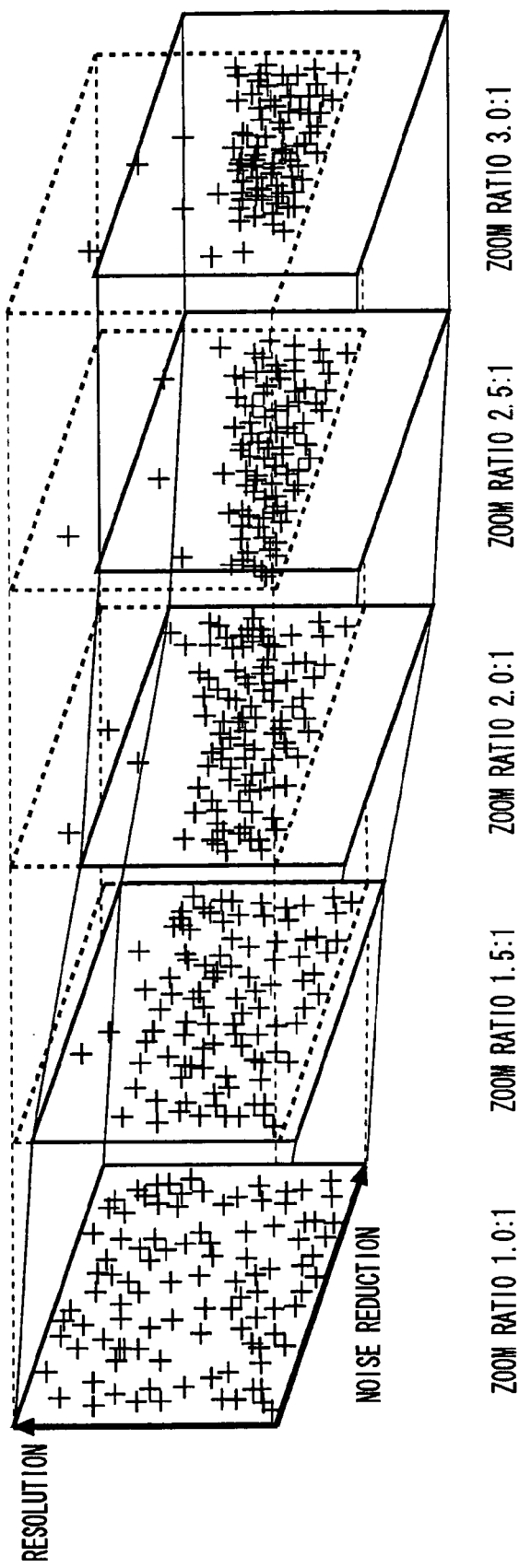
FIG. 16 is a diagram for showing calculated adjusting regions of the resolution and noise reduction relative to each of the zoom ratios.

In this case, the user's adjusting regions of the resolution and noise reduction are obtained by setting the adjusting regions of the resolution and noise reduction as the ones shown by the frames of solid lines in FIG. 16. This allows substantially wider adjusting regions to be provided to the user even if the zoom ratio is larger. It is to be noted that the adjusting regions shown by dotted lines in FIG. 16 show the adjusting regions of the resolution and noise reduction, which correspond to those shown in FIG. 15.

The following will describe how to generate items of the coefficient seed data, which are stored in the coefficient memory 83 of the removable substrate 70, for each class relative to each state (including a combination of a state of the received image signal and a zoom state of image by the image signal, which are altered according to the switch of image signal source, the switch of broadcast channel or the alteration of zoom ratio). These items of the coefficient seed data are generated by learning. It is assumed that items of the coefficient seed data wi0 to wi9, which are items of the coefficient data used in the production equation as given in the equation (2), are generated by the learning.

For ease of explanation, tj (j=0 to 9) is defined as given in equation (3).

$$t_0=1, t_1=r, t_2=z, t_3=r^2, t_4=rz, t_5=z^2, t_6=r^3, t_7=r^2z,$$
$$t_8=rz^2, t_9=z^3 \quad (3)$$

By using this equation (3), the equation (2) is rewritten as equation (4).

$$Wi = \sum_{j=0}^{9} w_{ij} t_j \quad (4)$$

Finally, an undetermined coefficient wij is obtained by the learning. That is, by using multiple items of learning data for each combination of class and output pixel, a coefficient value that minimizes a square error is determined. This solution employs a so-called least-squares method. Assuming the number of times of learning to be m, a remainder of the k'th item of learning data ($1 \leq k \leq m$) to be ek, and a total sum of the square errors to be E, E can be given by equation (5) based on the equations (1) and (2).

$$E = \sum_{k=1}^{m} e_k^2 \quad (5)$$
$$= \sum_{k=1}^{m} [yk - (W_{1 \times 1k} + W_{2 \times 2k} + \ldots + W_{n \times nk})]^2$$

-continued $$= \sum_{k=1}^{m} \{y_k - [t_0 w_{10} + t_1 w_{11} + \ldots + t_9 w_{19}) x_{1k} + \ldots +$$

$$(t_0 w_{n0} + t_1 w_{n1} + \ldots + t_9 w_{n9}) x_{nk}]\}^2$$

where xik indicates the kth item of pixel data at the ith prediction tap position of an SD signal and $y_k$ indicates the corresponding kth item of pixel data of an HD signal.

By the solution based on the least-squares method, such $w_{ij}$ is obtained that a partial differentiation by use of $w_{ij}$ in the equation (5) may be 0. This is indicated by following equation (6).

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \quad (6)$$

Similarly, by defining $X_{ipjq}$ and $Y_{ip}$ as following equations (7) and (8), the equation (6) can be rewritten as following equation (9) by using a matrix.

$$X_{ipjq} = \sum_{k=1}^{m} x_{ik} t_p x_{jk} t_q \quad (7)$$

$$Y_{ip} = \sum_{k=1}^{m} x_{ik} t_p x_{yk} \quad (8)$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \quad (9)$$

This equation (9) is a normal equation for calculating coefficient seed data, $w_{i0}$ to $w_{i9}$. By solving this normal equation by a generic solution such as a sweeping-out (Gauss-Jordan elimination) method, items of the coefficient seed data, $w_{i0}$ to $w_{i9}$ (i=1 to n) can be obtained.

Figure 17:
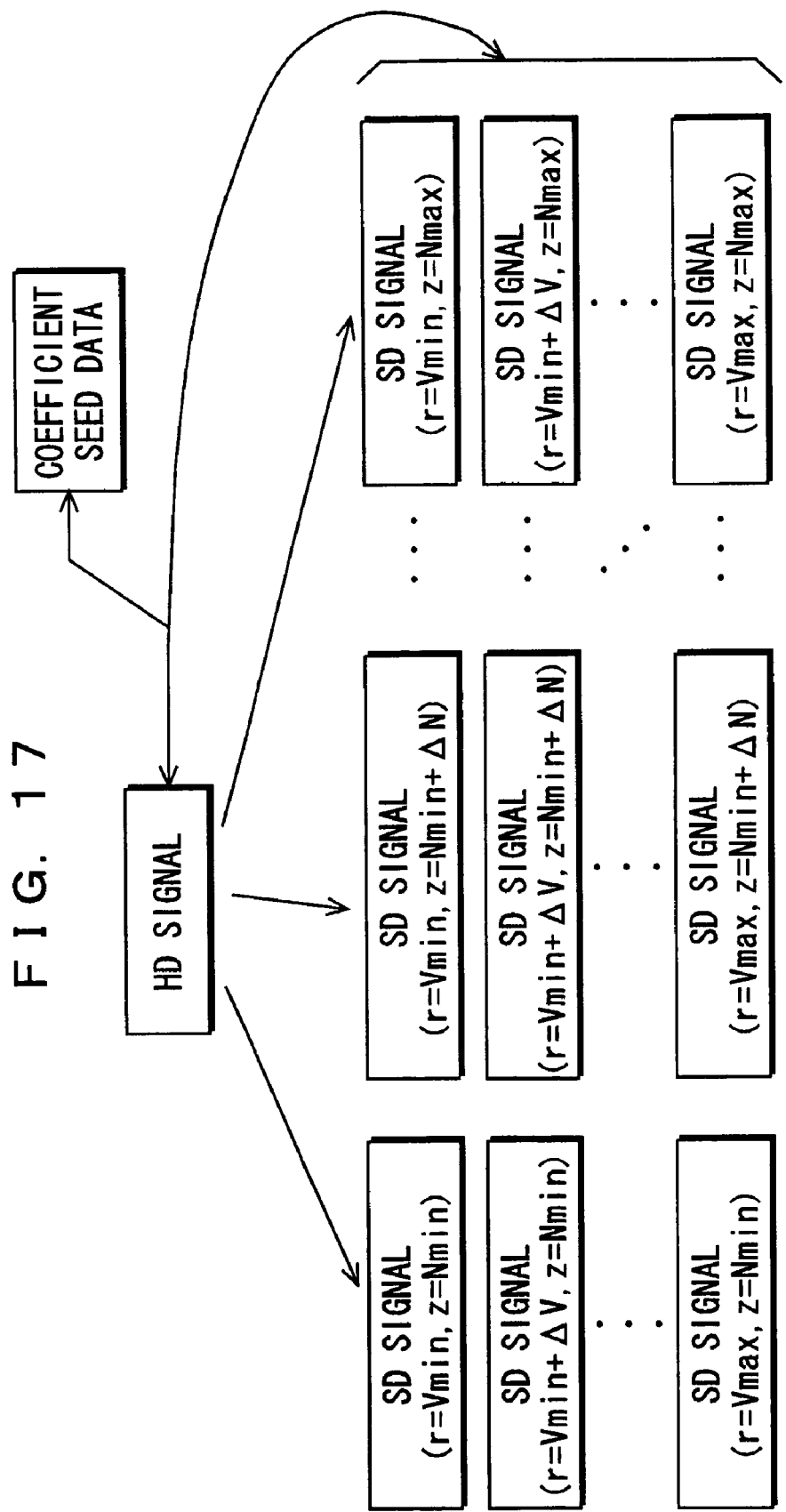
FIG. 17 is a diagram for illustrating how to generate coefficient seed data.

FIG. 17 shows a concept of the above-described coefficient seed data production method at a state.

From an HD signal as a teacher signal, a plurality of SD signals as student signals is produced. It is to be noted that SD signals having different resolutions are produced by changing frequency characteristics of a thinning filter that is used when producing the SD signals from the HD signal.

By using the SD signals having different resolutions, items of the coefficient seed data having different resolution-improving effects can be produced. For example, assuming that there are an SD signal from which a more blurred image is obtained and an SD signal from which a less blurred image is obtained, coefficient seed data having larger resolution-improving effects is produced through learning by use of the SD signals each for the more blurred image, while coefficient seed data having smaller resolution-improving effects is produced through learning by use of the SD signals each for the less blurred image.

Further, by adding noise to each of the SD signals having different resolutions, noise-added SD signals are produced. By varying a quantity of noise to be added, SD signals having different noise quantities added thereto are produced, thereby producing items of the coefficient seed data having different noise rejection effects. For example, assuming that there are an SD signal to which more noise is added and an SD signal to which less noise is added, coefficient seed data having larger noise rejection effect is produced through learning by use of the SD signals each having more noise added thereto, while coefficient seed data having smaller noise rejection effect is produced through learning by use of the SD signals each having less noise added thereto.

The quantity of noise to be added is adjusted by varying a value of a variable G if, for example, as shown in the following equation (10), noise n multiplied by the variable G is added to a pixel value x of an SD signal to produce a pixel value x' of a nose-added SD signal.

$$x' = x + G \cdot n \quad (10)$$

For example, a parameter r for adjusting image quality that changes frequency characteristics is varied in plural steps at a set step of $\Delta V$ within a range from minimum value Vmin to maximum value Vmax in the adjusting region of the resolution obtained in the above state and a parameter z for adjusting image quality that changes the quantity of noise to be added is also varied in plural steps at a set step of $\Delta N$ within a range from minimum value Nmin to maximum value Nmax in the adjusting region of the noise reduction obtained in the above state, thereby producing plural species of SD signals. Through learning between the SD signals thus produced and the HD signal, the coefficient seed data is produced. These parameters r and z correspond to the parameters r and z for adjusting image quality to be supplied to the coefficient-data-generating unit 215 of the image quality alteration unit shown in FIG. 3.

Figure 18:
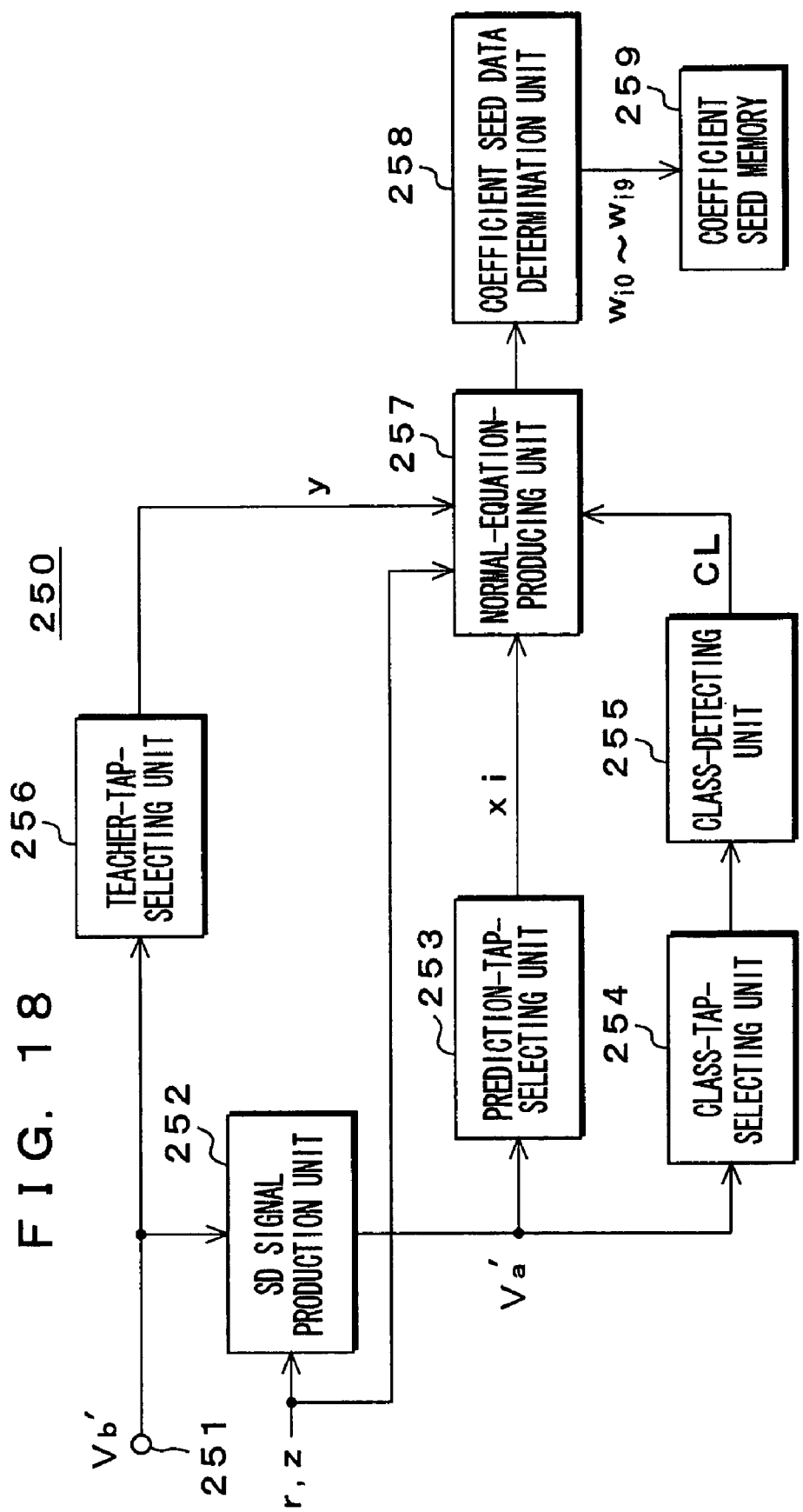
FIG. 18 is a block diagram for showing a configuration of an apparatus for generating the coefficient seed data.

The following will describe coefficient-seed-data-generating apparatus that generates items of the above coefficient seed data, $w_{i0}$ to $w_{i9}$. FIG. 18 shows a configuration of the coefficient-seed-data-generating apparatus 250.

The coefficient-seed-data-generating apparatus 250 has a receiving terminal 251 and an SD signal production unit 252. The receiving terminal 251 receives an image signal Vb' as the teacher signal, which corresponds to the above image signal Vb. The SD signal production unit 252 produces an image signal Va' as a student signal, which corresponds to the above image signal Va, by performing horizontal and vertical thinning processing on this image signal Vb'. This SD signal production unit 252 is supplied with the parameters r and z for adjusting the image quality. In accordance with the parameter r, frequency characteristics of the thinning filter used when the image signal Va' is produced from the image signal Vb' are varied. Further, in accordance with the parameter z, the quantity of noise to be added to the image signal Va' is varied.

The coefficient-seed-data-generating apparatus 250 further has a prediction-tap-selecting unit 253 and a class-tap-selecting unit 254. These tap-selecting units 253 and 254 selectively extracts multiple items of the image data, as the prediction tap data and the class tap data, respectively, that are positioned around the target position in the image signal Vb' based on the image signal Va' produced in the SD signal production unit 252. These tap-selecting units 253 and 254 respectively correspond to the tap-selecting units 212 and 213 of the above processing unit 202 (see FIG. 3).

The coefficient-seed-data-generating apparatus 250 additionally has a class-detecting unit 255. This class-detecting unit 255 performs data processing on the items of pixel data as the class tap data that are selectively extracted by the class-tap-selecting unit 254 to obtain a class code CL indicating a class to which pixel data of the target position in the image signal Vb' belongs. This class-detecting unit 255 corresponds to the class-detecting unit 214 of the above processing unit 202.

The coefficient-seed-data-generating apparatus 250 still further has a teacher-tap-selecting unit 256. This teacher-tap-selecting unit 256 selectively extracts the pixel data of the target position in the image signal Vb' from the image signal Vb'.

The coefficient-seed-data-generating apparatus 250 still additionally has a normal-equation-producing unit 257. This normal-equation-producing unit 257 produces the normal equation (see the equation (9)) for producing items of the coefficient seed data, $w_{i0}$ to $w_{i9}$, for each class from the pixel data y of each target position in the image signal Vb' that has been selectively extracted in the teacher-tap-selecting unit 256, multiple items of the pixel data xi as the prediction tap data that have been selectively selected in the prediction-tap-selecting unit 253 corresponding to the pixel data y of each of the target positions, the class codes CL that have been produced in the class-detecting unit 255 respectively corresponding to the pixel data y of each of the target positions, and values of the parameters r and z for adjusting image quality.

In relation to a pair of one item of pixel data y and multiple items of pixel data xi corresponding thereto, one item of learning data is produced. Many items of the learning data are produced for each class in relation to a pair of the image signal Vb' as the teacher signal and image signals Va' as the student signals corresponding thereto. This allows the normal equation for producing the coefficient seed data, $w_{i0}$ to $w_{i9}$, for each class to be produced in the normal-equation-producing unit 257.

In this case, in the normal-equation-producing unit 257, the normal equation is also produced for each of the output pixels (HD1 through HD4 and HD1' through HD4' shown in FIG. 6). Namely, the normal equations corresponding to these pixels, HD1 through HD4 and HD1' through HD4', are produced using items of the learning data that are composed of items of the pixel data y, lags from the center prediction tap SD0 or SD0' of which has the same relationship with those of the output pixels, HD1 through HD4 and HD1' through HD4'. After all, in the normal-equation-producing unit 257, the normal equation for producing the coefficient seed data, $w_{i0}$ to $w_{i9}$, is produced for each combination of the class and the output pixel.

The coefficient-seed-data-generating apparatus 250 further has a coefficient seed data determination unit 258 and a coefficient seed memory 259. The coefficient seed data determination unit 258 receives data of the normal equations from the normal-equation-producing unit 257 and then solves each of the normal equations by using the sweeping-out (Gauss-Jordan elimination) method or the like, in order to obtain the coefficient seed data, $w_{i0}$ to $w_{i9}$, for each combination of the class and the output pixel. The coefficient seed memory 259 then stores such the coefficient seed data, $w_{i0}$ to $w_{i9}$, thus obtained in the coefficient seed data determination unit 258.

The following will describe operations of the coefficient-seed-data-generating apparatus 250 shown in FIG. 18.

At the receiving terminal 251, the image signal Vb' as the teacher signal is supplied. Then, this image signal Vb' is subjected to the thinning-out processing horizontally and vertically in the SD signal production unit 252, thereby producing the image signals Va' as the student signals. In this case, the parameters r and z for adjusting image quality are also supplied into the SD signal production unit 252 as the control signal, thereby serially producing plural image signals Va' with them varying in steps in the frequency characteristics and the noise addition amounts.

In the class-tap-selecting unit 254, multiple items of pixel data that are positioned around the target position in the image signal Vb' are selectively extracted as the class tap data based on the image signals Va'. These items of pixel data are supplied to the class-detecting unit 255. This class-detecting unit 255 then performs data compression processing such as ADRC processing on respective items of the pixel data, thereby producing the class code CL indicating a class to which the pixel data of the target position in the image signal Vb' belongs. This class code CL is supplied to the normal-equation-producing unit 257.

Also, in the prediction-tap-selecting unit 253, based on the image signals Va', multiple items of the pixel data xi, as the prediction tap data, that are positioned around the target position in the image signal Vb' are selectively extracted. These items of pixel data xi are also supplied to the normal-equation-producing unit 257. In the teacher-tap-selecting unit 256, based on the image signals Vb', the pixel data y of the target position in the corresponding image signal Vb' is also selectively extracted. This pixel data y is also supplied to the normal-equation-producing unit 257.

Then, the normal-equation-producing unit 257 produces the normal equations (see the equation (9)) for producing the coefficient seed data, wi0 to wi9, for each combination of the class and the output pixel subjecting to each of the target positions in the image signal Vb', in correspondence to the pixel data y of the corresponding respective target positions, items of the pixel data xi, as prediction tap data, each corresponding to the pixel data y thus given, the class code CL indicating to the class to which the pixel data y of each of the target positions belongs, the values of the parameters, r and z for adjusting image quality supplied to the SD signal production unit 252.

Then, the coefficient seed data determination unit 258 receives data on this normal equation from this normal-equation-producing unit 257, and solves this normal equation by using the sweeping-out (Gauss-Jordan elimination) method or the like, in order to obtain the coefficient seed data, $w_{i0}$ to $w_{i9}$, for each combination of the class and the output pixel. These items of the coefficient seed data, $w_{i0}$ to $w_{i9}$, are supplied to the coefficient seed memory 259.

Thus, in the coefficient-seed-data-generating apparatus 250 shown in FIG. 18, the items of the coefficient seed data, wi0 to wi9, to be stored in the coefficient memory 83 of the removable substrate 70 can be generated.

As described above, the storage unit 81 of the removable substrate 70 in the image-processing apparatus 51 shown in FIG. 2 stores as history information the control commands relative to the alteration of zoom ratio, the alteration of resolution, the alteration of noise reduction, the switch of image signal source, the switch of broadcast channel and the like. Therefore, if the removable substrate 70 is collected, adjustment information on the quality of output (information on the predictive adjustment values of the resolution and noise reduction, and information on the adjusting region thereof) corresponding to the user's preference at each state (including a combination of the state of the received image signal and the zoom state of image by the image signal, which are altered according to the switch of image signal source, the switch of broadcast channel or the alteration of zoom ratio) can be obtained based on the stored contents in the storage unit 81. Thus, the process to obtain the adjustment information on the quality of output is not performed in the image-processing apparatus 51, thereby preventing a configuration of the image-processing apparatus 51 itself from being complicated.

Although the examples of the resolution and noise reduction have been described as the quality of image by the image signal in the above embodiments, the quality of image of the invention is not limited to those examples. For example, brightness, contrast, color temperature and the like are conceivable as the quality of image.

Although the switch of image signal source and the switch of broadcast channel have been described in the above embodiments as the state of the received image signal, the invention is not limited to this. Other state is available. For example, a noise level in the received image signal or the like is conceivable as the state of the received image signal.

Although the zoom state has been described in the above embodiments as the state of image by the image signal, the invention is not limited to this. Other state is available. For example, if CRT display, LDP, PDP and like can be switched as output device, these switched states are available.

Although the image signal has been described in the above embodiments as the informational signal, the invention is not limited to this. This invention is similarly applicable to an audio signal as the informational signal. In this case, as state of the received audio signal, a switch of the audio signal source, a switch of broadcast channel or a noise level in the audio signal is conceivable. As a state of audio by the audio signal, volume and the like are conceivable. As quality of audio by the audio signal, noise reduction, resolution and the like are conceivable.

Although it has been described in the above embodiments that the removable substrate is collected to obtain various kinds of information based on the stored contents in the storage unit, it is also possible to obtain various kinds of information, in this invention, by collecting and reusing data relative to such the contents through a network such as the Internet.

Thus, the embodiments of the invention are preferably applied to an image display apparatus, an audio apparatus and the like, for which the storage portion for storing the set history information on a state of the received informational signal and a state of output by the informational signal and the adjustment history information on the quality of output by the informational signal is provided, thereby allowing the adjustment information on the quality of output corresponding to the user's preference at each state to be obtained on the basis of the stored contents in the storage unit through the collection of the removable substrate.

According to the above embodiments of the invention, the storage portion that stores the set history information on the state of the received informational signal and the state of the output by the informational signal and/or the adjustment history information on the quality of output by the informational signal is provided for the removable substrate, which is detachably connected to the information-processing device (the information-processing apparatus). If the removable substrate is collected by a manufacturer or the like, the manufacturer or the like can obtain any adjustment information on the quality of output by the informational signal, which corresponds to user's preference, at each state set by the setting means, based on the stored contents in the storage portion. This allows to be provided an information-processing apparatus and the like that are less complicated in its configuration and can easily adjust the quality of output to the one that is suited to each individual user's preference.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information-processing apparatus comprising:
   an information-processing device that processes information; and
   a removable substrate that is detachably connected to the information-processing device,
   wherein the information-processing device includes:
      signal-processing means for processing a received informational signal to set a quality of output by the received informational signal to a prescribed quality,
      adjusting means for allowing a user to adjust the prescribed quality in the signal-processing means, and
      setting means for allowing the user to set at least any one of a state of the received informational signal and a state of output by the received informational signal, and
   wherein the removable substrate includes storage means for storing a set history of the setting means and an adjustment history of the adjusting means.

2. The information-processing apparatus according to claim 1, wherein the state of the received informational signal includes any one of a switched state of broadcast channel from which the informational signal is obtained and a switched state of informational signal source from which the informational signal is obtained.

3. The information-processing apparatus according to claim 1, wherein the informational signal includes an image signal; and
   wherein the state of output by the informational signal includes a zoom state of image by the image signal.

4. The information-processing apparatus according to claim 1, wherein the removable substrate further includes a first holding means for holding a predictive adjustment value of the quality of output by the informational signal, said quality of output corresponding to each state set by the setting means.

5. The information-processing apparatus according to claim 4, wherein when the prescribed state is set in the setting means, any one of the information-processing device and the removable substrate further includes controlling means for controlling the signal-processing means to obtain the quality of output that corresponds to the predictive adjustment value of the prescribed state, said predictive adjustment value being held in the first holding means of the removable substrate.

6. The information-processing apparatus according to claim 1, wherein the removable substrate further includes a second holding means for holding information on an adjusting region of the quality of output by the adjusting means, said quality of output corresponding to each state set by the setting means.

7. The information-processing apparatus according to claim 1, wherein the signal-processing means includes:
   data-selecting means for selecting multiple items of informational data based on the received informational signal, said multiple items of informational data being positioned around a target position in an output informational signal;

coefficient-data-generating means for generating coefficient data of an estimate equation using coefficient seed data and the adjustment value by the adjusting means; and calculation means for calculating and obtaining informational data of the target position in the output informational signal based on the estimate equation using the multiple items of the informational data, which are selected in the data-selecting means, and the coefficient data, which is generated in the coefficient-data-generating means; and wherein the removable substrate further includes a third holding means for holding the coefficient seed data corresponding to each state set by the setting means.

8. An information-processing apparatus comprising:

an information-processing device that processes information; and a removable substrate that is detachably connected to the information-processing device, wherein the information-processing device includes:

a signal-processing unit configured to process a received informational signal to set a quality of output by the received informational signal to a prescribed quality;

an adjusting unit configured to allow a user to adjust the prescribed quality in the signal-processing unit; and a setting unit configured to allow the user to set at least any one of a state of the received informational signal and a state of output by the received informational signal, and wherein the removable substrate includes a storage unit configured to store a set history of the setting unit and an adjustment history of the adjusting unit.

9. A removable substrate that is detachably connected to an information-processing apparatus, the apparatus comprising:

signal-processing means for processing a received informational signal to set a quality of output by the received informational signal to a prescribed quality;

adjusting means for allowing a user to adjust the prescribed quality in the signal-processing means; and setting means for allowing the user to set at least any one of a state of the received informational signal and a state of output by the informational signal, wherein the removable substrate includes a storage means for storing a set history of the setting means and an adjustment history of the adjusting means.

10. The removable substrate according to claim 9, further comprising a first holding means for holding a predictive adjustment value of the quality of output by the informational signal, said quality of output corresponding to each state set by the setting means.

11. The removable substrate according to claim 9, further comprising a second holding means for holding information on an adjusting region of the quality of output by the adjusting means, said quality of output corresponding to each state set by the setting means.

12. A removable substrate that is detachably connected to an information-processing apparatus, the apparatus comprising:

a signal-processing unit configured to process a received informational signal to set a quality of output by the received informational signal to a prescribed quality;

an adjusting unit configured to allow a user to adjust the prescribed quality in the signal-processing unit; and a setting unit configured to allow the user to set at least any one of a state of the received informational signal and a state of output by the received informational signal, wherein the removable substrate includes a storage unit configured to store a set history of the setting unit and an adjustment history of the adjusting unit.

* * * * *